US011930325B2

(12) United States Patent
Bishop et al.

(10) Patent No.: US 11,930,325 B2
(45) Date of Patent: Mar. 12, 2024

(54) DIRECT PRINT CHASSIS FOR CONTACT HEARING SYSTEM

(71) Applicant: Earlens Corporation, Menlo Park, CA (US)

(72) Inventors: Mark Bishop, Pleasanton, CA (US); Michael Doung, Emeryville, CA (US); Turlif Vilbrant, Portland, OR (US); Marco Teran, San Francisco, CA (US); Kenneth Mejia, San Francisco, CA (US); Srikant Mantha, Pleasanton, CA (US); William Facteau, Atherton, CA (US); William Whitesides, San Francisco, CA (US); Jose Pedroza, Oakland, CA (US)

(73) Assignee: Earlens Corporation, Menlo Park, CA (US)

( * ) Notice: Subject to any disclaimer, the term of this patent is extended or adjusted under 35 U.S.C. 154(b) by 36 days.

(21) Appl. No.: 17/482,240

(22) Filed: Sep. 22, 2021

(65) Prior Publication Data

US 2022/0014860 A1 Jan. 13, 2022

Related U.S. Application Data

(63) Continuation of application No. PCT/US2020/024669, filed on Mar. 25, 2020.

(Continued)

(51) Int. Cl.
*H04R 25/00* (2006.01)

(52) U.S. Cl.
CPC ......... *H04R 25/554* (2013.01); *H04R 25/606* (2013.01); *H04R 25/652* (2013.01); *H04R 2225/57* (2019.05)

(58) Field of Classification Search
CPC .... H04R 1/1016; H04R 1/105; H04R 1/1041; H04R 25/02
See application file for complete search history.

(56) References Cited

U.S. PATENT DOCUMENTS 5,259,032 A 11/1993 Perkins et al.
5,624,376 A 4/1997 Ball et al.

(Continued)

FOREIGN PATENT DOCUMENTS

DE 3508830 A1 9/1986
EP 1968347 A2 9/2008

(Continued)

OTHER PUBLICATIONS

Dundas et al. The Earlens Light-Driven Hearing Aid: Top 10 questions and answers. Hearing Review. 2018;25(2):36-39.

(Continued)

*Primary Examiner* — Amir H Etesam
(74) *Attorney, Agent, or Firm* — Polsinelli PC

(57) ABSTRACT

A contact hearing device includes a chassis, sulcus platform and umbo platform wherein the chassis is formed as a single continuous material, the sulcus platform is formed as a single continuous material, and the umbo platform is formed as a single continuous material. The chassis may include a receiver mount, a motor mount pocket and a central frame. The sulcus platform includes one or more registration features adapted to mate with at least a portion of the chassis, (Continued)

the umbo platform includes a drive post landing pad, the drive post landing pad including at least one alignment feature.

17 Claims, 28 Drawing Sheets

Related U.S. Application Data

(60) Provisional application No. 62/990,947, filed on Mar. 17, 2020, provisional application No. 62/824,967, filed on Mar. 27, 2019.

(56) References Cited

U.S. PATENT DOCUMENTS

| | | | | |
|---|---|---|---|---|
| 5,804,109 | A | 9/1998 | Perkins | |
| 6,068,589 | A | 5/2000 | Neukermans | |
| 6,137,889 | A | 10/2000 | Shennib et al. | |
| 6,190,305 | B1 | 2/2001 | Ball et al. | |
| 6,491,644 | B1 | 12/2002 | Vujanic et al. | |
| 6,724,902 | B1 | 4/2004 | Shennib et al. | |
| 6,931,231 | B1 | 8/2005 | Griffin | |
| 6,940,989 | B1 | 9/2005 | Shennib et al. | |
| 7,095,981 | B1 | 8/2006 | Voroba et al. | |
| 7,289,639 | B2 | 10/2007 | Abel et al. | |
| 7,630,646 | B2 | 12/2009 | Anderson et al. | |
| 7,983,435 | B2 | 7/2011 | Moses | |
| 8,116,494 | B2 | 2/2012 | Rass | |
| 8,157,730 | B2 | 4/2012 | LeBoeuf et al. | |
| 8,204,786 | B2 | 6/2012 | LeBoeuf et al. | |
| 8,251,903 | B2 | 8/2012 | LeBoeuf et al. | |
| 8,295,523 | B2 | 10/2012 | Fay et al. | |
| 8,320,982 | B2 | 11/2012 | LeBoeuf et al. | |
| 8,512,242 | B2 | 8/2013 | LeBoeuf et al. | |
| 8,545,383 | B2 | 10/2013 | Wenzel et al. | |
| 8,600,089 | B2 | 12/2013 | Wenzel et al. | |
| 8,647,270 | B2 | 2/2014 | LeBoeuf et al. | |
| 8,652,040 | B2 | 2/2014 | LeBoeuf et al. | |
| 8,700,111 | B2 | 4/2014 | LeBoeuf et al. | |
| 8,702,607 | B2 | 4/2014 | LeBoeuf et al. | |
| 8,788,002 | B2 | 7/2014 | LeBoeuf et al. | |
| 8,885,860 | B2 | 11/2014 | Djalilian et al. | |
| 8,886,269 | B2 | 11/2014 | LeBoeuf et al. | |
| 8,888,701 | B2 | 11/2014 | LeBoeuf et al. | |
| 8,923,941 | B2 | 12/2014 | LeBoeuf et al. | |
| 8,929,965 | B2 | 1/2015 | LeBoeuf et al. | |
| 8,929,966 | B2 | 1/2015 | LeBoeuf et al. | |
| 8,934,952 | B2 | 1/2015 | LeBoeuf et al. | |
| 8,942,776 | B2 | 1/2015 | LeBoeuf et al. | |
| 8,961,415 | B2 | 2/2015 | LeBoeuf et al. | |
| 8,989,830 | B2 | 3/2015 | LeBoeuf et al. | |
| 9,044,180 | B2 | 6/2015 | LeBoeuf et al. | |
| 9,131,312 | B2 | 9/2015 | LeBoeuf et al. | |
| 9,289,135 | B2 | 3/2016 | LeBoeuf et al. | |
| 9,289,175 | B2 | 3/2016 | LeBoeuf et al. | |
| 9,301,696 | B2 | 4/2016 | LeBoeuf et al. | |
| 9,314,167 | B2 | 4/2016 | LeBoeuf et al. | |
| 9,392,377 | B2 | 7/2016 | Olsen et al. | |
| 9,427,191 | B2 | 8/2016 | LeBoeuf | |
| 9,521,962 | B2 | 12/2016 | LeBoeuf | |
| 9,538,921 | B2 | 1/2017 | LeBoeuf et al. | |
| 9,750,462 | B2 | 9/2017 | LeBoeuf et al. | |
| 9,788,785 | B2 | 10/2017 | LeBoeuf | |
| 9,788,794 | B2 | 10/2017 | LeBoeuf et al. | |
| 9,794,653 | B2 | 10/2017 | Aumer et al. | |
| 9,801,552 | B2 | 10/2017 | Romesburg | |
| 9,808,204 | B2 | 11/2017 | LeBoeuf et al. | |
| 2005/0190939 | A1 | 9/2005 | Fretz | |
| 2008/0152178 | A1 | 6/2008 | Topholm et al. | |
| 2009/0092271 | A1 | 4/2009 | Fay et al. | |
| 2013/0230204 | A1 | 9/2013 | Monahan et al. | |
| 2014/0056453 | A1 | 2/2014 | Olsen et al. | |
| 2017/0095167 | A1* | 4/2017 | Facteau | H04R 25/02 |
| 2017/0195809 | A1 | 7/2017 | Teran et al. | |
| 2018/0184191 | A1 | 6/2018 | Kim et al. | |

FOREIGN PATENT DOCUMENTS

| | | | |
|---|---|---|---|
| GB | 392625 | A | 5/1933 |
| KR | 100624445 | B1 | 9/2006 |
| WO | WO-2020198334 | A1 | 10/2020 |

OTHER PUBLICATIONS

European search report and opinion dated Nov. 29, 2022 for EP Application No. 20776958.9.

Fay, et al. Preliminary evaluation of a light-based contact hearing device for the hearing impaired. Otol Neurotol. Jul. 2013;34(5):912-21. doi: 10.1097/MAO.0b013e31827de4b1.

Folkeard, et al. Detection, Speech Recognition, Loudness, and Preference Outcomes With a Direct Drive Hearing Aid: Effects of Bandwidth. Trends Hear. Jan.-Dec. 2021; 25: 1-17. doi: 10.1177/23312165211999139.

Fritsch, et al. EarLens transducer behavior in high-field strength MRI scanners. Otolaryngol Head Neck Surg. Mar. 2009;140(3):426-8. doi: 10.1016/j.otohns.2008.10.016.

Gantz, et al. Broad Spectrum Amplification with a Light Driven Hearing System. Combined Otolaryngology Spring Meetings, 2016 (Chicago).

Gantz, et al. Light Driven Hearing System: A Multi-Center Clinical Study. Association for Research in Otolaryngology Annual Meeting, 2016 (San Diego).

Gantz, et al. Light-Driven Contact Hearing Aid for Broad Spectrum Amplification: Safety and Effectiveness Pivotal Study. Otology & Neurotology Journal, 2016 (in review).

Gantz, et al. Light-Driven Contact Hearing Aid for Broad-Spectrum Amplification: Safety and Effectiveness Pivotal Study. Otology & Neurotology. Copyright 2016. 7 pages.

International search report with written opinion dated Aug. 20, 2020 for PCT/US2020/024669.

Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.

Khaleghi, et al. Attenuating the ear canal feedback pressure of a laser-driven hearing aid. J Acoust Soc Am. Mar. 2017;141(3):1683.

Khaleghi, et al. Attenuating the feedback pressure of a light-activated hearing device to allows microphone placement at the ear canal entrance. IHCON 2016, International Hearing Aid Research Conference, Tahoe City, CA, Aug. 2016.

Khaleghi, et al. Characterization of Ear-Canal Feedback Pressure due to Umbo-Drive Forces: Finite-Element vs. Circuit Models. ARO Midwinter Meeting 2016, (San Diego).

Khaleghi, et al. Mechano-Electro-Magnetic Finite Element Model of a Balanced Armature Transducer for a Contact Hearing Aid. Proc. MoH 2017, Mechanics of Hearing workshop, Brock University, Jun. 2017.

Khaleghi, et al. Multiphysics Finite Element Model of a Balanced Armature Transducer used in a Contact Hearing Device. ARO 2017, 40th ARO MidWinter Meeting, Baltimore, MD, Feb. 2017.

Lee, et al. A Novel Opto-Electromagnetic Actuator Coupled to the tympanic Membrane. J Biomech. Dec. 5, 2008;41(16):3515-8. Epub Nov. 7, 2008.

Lee, et al. The optimal magnetic force for a novel actuator coupled to the tympanic membrane: a finite element analysis. Biomedical engineering: applications, basis and communications. 2007; 19(3):171-177.

Levy, et al. Characterization of the available feedback gain margin at two device microphone locations, in the fossa triangularis and Behind the Ear, for the light-based contact hearing device. Acoustical Society of America (ASA) meeting, 2013 (San Francisco).

Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.

Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.

(56) References Cited

OTHER PUBLICATIONS

McElveen et al. Overcoming High-Frequency Limitations of Air Conduction Hearing Devices Using a Light-Driven Contact Hearing Aid. Poster presentation at The Triological Society, 120th Annual Meeting at COSM, Apr. 28, 2017; San Diego, CA.

Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0b013e31818246f6.

Perkins, et al. Light-based Contact Hearing Device: Characterization of available Feedback Gain Margin at two device microphone locations. Presented at AAO-HNSF Annual Meeting, 2013 (Vancouver).

Perkins, et al. The EarLens Photonic Transducer: Extended bandwidth. Presented at AAO-HNSF Annual Meeting, 2011 (San Francisco).

Perkins, et al. The EarLens System: New sound transduction methods. Hear Res. Feb. 2, 2010; 10 pages total.

Perkins, R. Earlens tympanic contact transducer: a new method of sound transduction to the human ear. Otolaryngol Head Neck Surg. Jun. 1996;114(6):720-8.

Puria, et al. Cues above 4 kilohertz can improve spatially separated speech recognition. The Journal of the Acoustical Society of America, 2011, 129, 2384.

Puria, et al. Extending bandwidth above 4 kHz improves speech understanding in the presence of masking speech. Association for Research in Otolaryngology Annual Meeting, 2012 (San Diego).

Puria, et al. Extending bandwidth provides the brain what it needs to improve hearing in noise. First international conference on cognitive hearing science for communication, 2011 (Linkoping, Sweden).

Puria, et al. Hearing Restoration: Improved Multi-talker Speech Understanding. 5th International Symposium on Middle Ear Mechanics In Research and Otology (MEMRO), Jun. 2009 (Stanford University).

Puria, et al. Imaging, Physiology and Biomechanics of the middle ear: Towards understating the functional consequences of anatomy. Stanford Mechanics and Computation Symposium, 2005, ed Fong J.

Puria, et al. Sound-Pressure Measurements In The Cochlear Vestibule Of Human-Cadaver Ears. Journal of the Acoustical Society of America. 1997; 101 (5-1): 2754-2770.

Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.

Puria, et al. The EarLens Photonic Hearing Aid. Association for Research in Otolaryngology Annual Meeting, 2012 (San Diego).

Puria, et al. The Effects of bandwidth and microphone location on understanding of masked speech by normal-hearing and hearing-impaired listeners. International Conference for Hearing Aid Research (IHCON) meeting, 2012 (Tahoe City).

Puria. Measurements of human middle ear forward and reverse acoustics: implications for otoacoustic emissions. J Acoust Soc Am. May 2003;113(5):2773-89.

Puria, S. Middle Ear Hearing Devices. Chapter 10. Part of the series Springer Handbook of Auditory Research pp. 273-308. Date: Feb. 9, 2013.

Song, et al. The development of a non-surgical direct drive hearing device with a wireless actuator coupled to the tympanic membrane. Applied Acoustics. Dec. 31, 2013;74(12):1511-8.

Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.

* cited by examiner

DIRECT PRINT CHASSIS FOR CONTACT HEARING SYSTEM

CROSS REFERENCE TO RELATED APPLICATIONS

This application is a continuation of PCT Application no. PCT/US2020/024669, filed Mar. 25, 2020; which claims priority to U.S. Provisional Patent Application No. 62/824,967, filed Mar. 27, 2019, and U.S. Provisional Patent Application No. 62/990,947, filed Mar. 17, 2020; which are incorporated herein by reference in their entirety.

BACKGROUND OF THE INVENTION

The present invention is directed to improved designs for contact hearing devices and, more particularly, improved designs for the support structures and platforms for such devices.

BRIEF DESCRIPTION OF THE DRAWINGS

The foregoing and other objects, features, and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Figure 1:
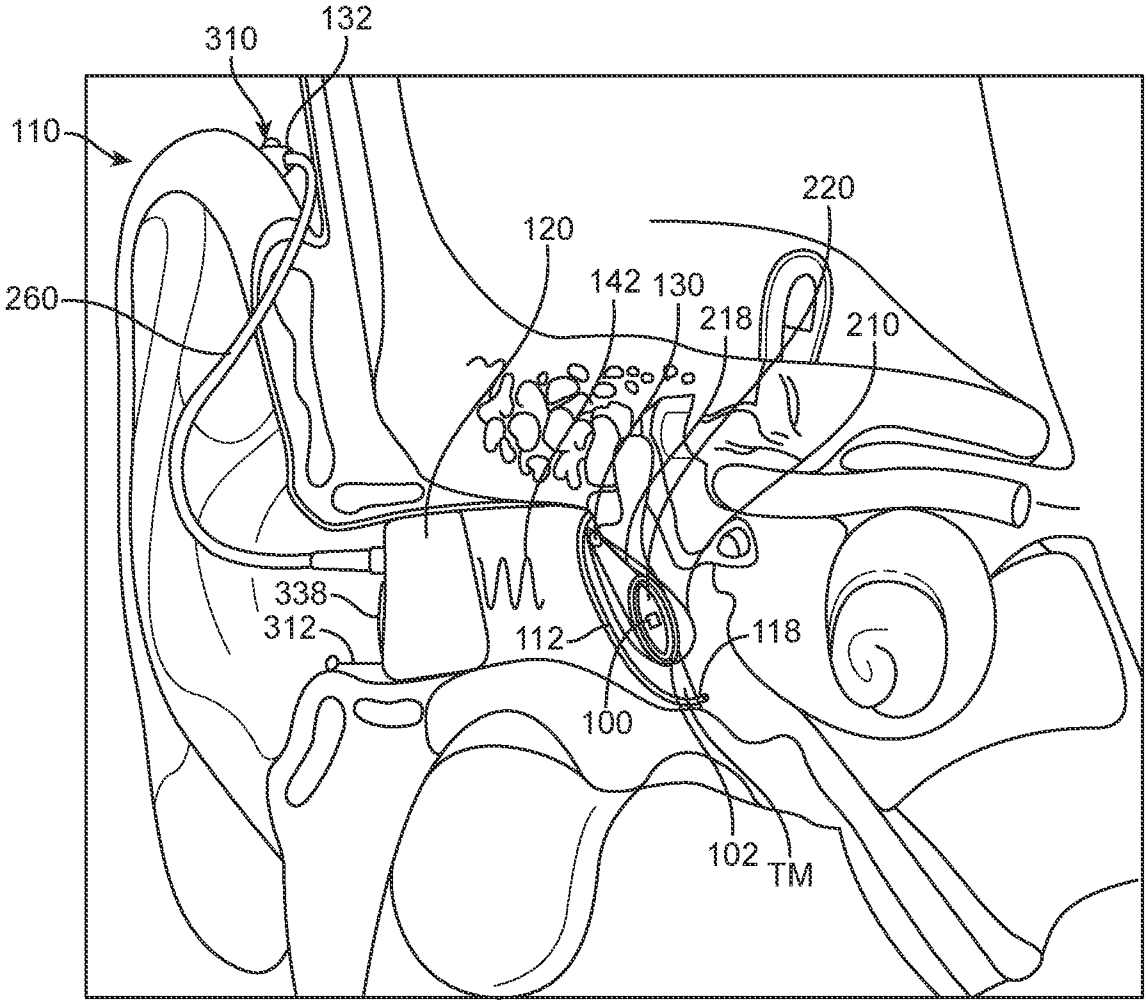
FIG. 1 is a cutaway view of an ear canal showing an inductively coupled contact hearing system according to the present invention wherein at least a portion of the contact hearing system is positioned in the ear canal.

FIG. 1 is a cutaway view of an ear canal showing an inductively coupled contact hearing system 110 for use in systems and methods according to the present invention, wherein at least a portion of the contact hearing system 110 is positioned in the ear canal. In embodiments of the invention, inductively coupled contact hearing system 110 may be referred to as a smart lens system or smart lens. In embodiments of the invention, inductively coupled contact hearing system 110 may comprise a contact hearing system using electromagnetic waves to transmit information and/or power from inductive ear tip 120 to inductively coupled contact hearing device 112. In embodiments of the invention inductively coupled contact hearing device 112 may be referred to as: a contact hearing device; an inductively coupled contact hearing device; a unibody floating contact hearing device; or unibody floating magnet contact hearing device. In embodiments of the invention, inductively coupled contact hearing system 110 may comprise a contact hearing system using inductive coupling to transmit information and/or power from inductive ear tip 120 to inductively coupled contact hearing device 112. In FIG. 1, inductively coupled contact hearing system 110 includes audio processor 132, which audio processor may include at least one external microphone 310. Audio processor 132 may be connected to inductive ear tip 120 by cable 260, which may be adapted to transmit signals from audio processor 132 to inductive ear tip 120. Inductive ear tip 120 may further include canal microphone 312 and at least one acoustic vent 338. Inductive ear tip 120 may be an ear tip which radiates electromagnetic waves 142 in response to signals from audio processor 132. Electromagnetic signals radiated by inductive ear tip 120 may be received by inductively coupled contact hearing device 112, which may comprise receive coil 130, drive wires 218, umbo platform 220, magnet 100, cantilever support 210 and drive coil 102.

In embodiments of the invention magnet 100 may be a strong permanent magnet. In embodiments of the invention magnet 100 may be a rare earth magnet, such as, for example, a samarium-cobalt (SmCo) magnet.

Figure 2:
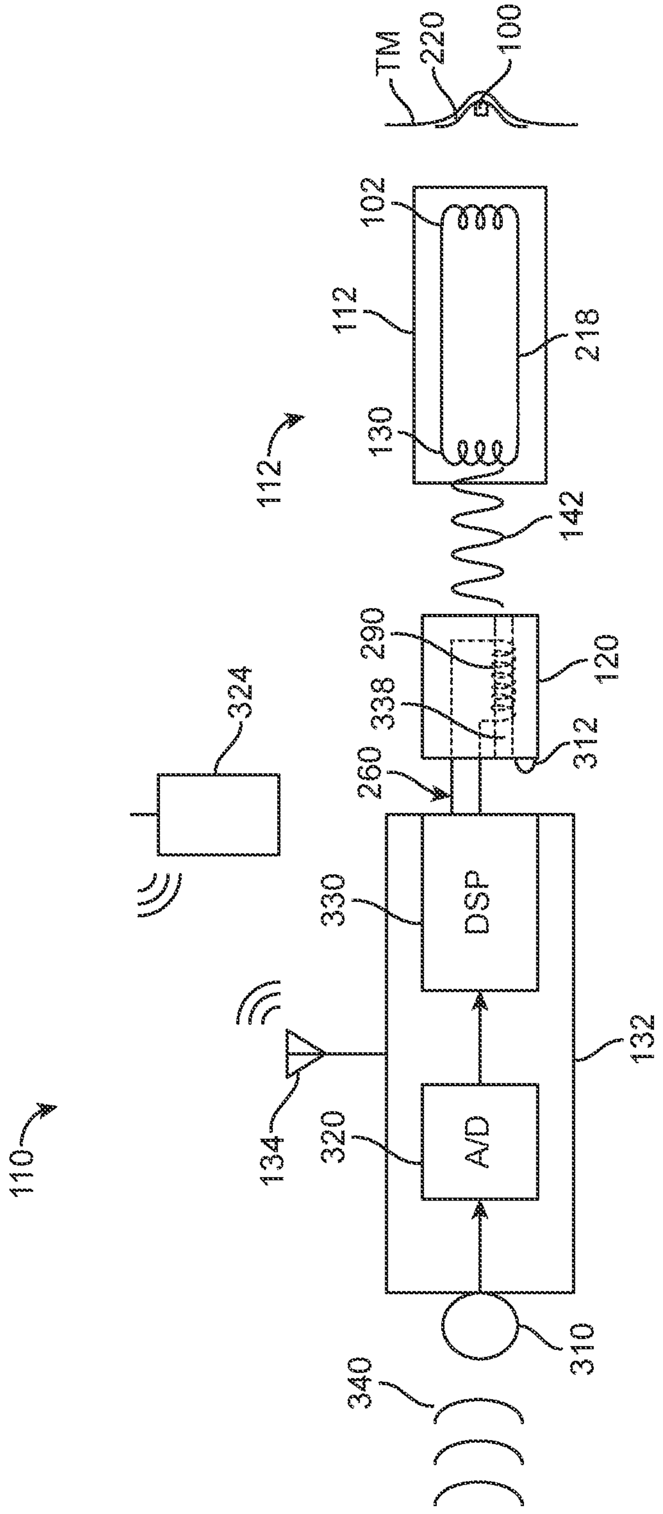
FIG. 2 is a block diagram of an inductively coupled contact hearing system according to the present invention.

FIG. 2 is a block diagram of an inductively coupled contact hearing system 110 for use in methods and apparatus according to the present invention. In embodiments of the invention, at least a portion of inductively coupled contact hearing system 110 is positioned in the ear canal of a user. In FIG. 2, ambient sound 340 may be received by external microphone 310 of audio processor 132, which then processes the received sound by passing it through processing circuitry, which may include analog to digital converter 320 and digital signal processor 330. The output of audio processor 132 may be transmitted to inductive ear tip 120 by cable 260. Signals transmitted to inductive ear tip 120 may then be transmitted to inductively coupled contact hearing device 112 by, for example, causing transmit coil 290 to radiate electromagnetic waves 142. In embodiments of the invention, inductively coupled contact hearing device 112 may include receive coil 130, drive coil 102, magnet 100 and umbo platform 220. Information contained in electromagnetic waves 142 received by receive coil 130 may be transmitted through drive coil 102 to magnet 100, moving umbo platform 220. In embodiments of the invention, the signal transmitted to inductive ear tip 120 may be a signal representative of audio signal receive by external microphone 310 which may then be transmitted to inductively coupled contact hearing device 112. In embodiments of the invention, transmit coil 290 may be wound around an acoustic vent 338 in inductive ear tip 120. In embodiments of the invention, acoustic vent 338 may be formed as a passage through a ferrite material or a ferromagnetic material. As used herein ferrite material may refer to any ferromagnetic material. In embodiments of the invention, transmit coil 290 may be wound around ferrite material positioned in inductive ear tip 120. In embodiments of the invention, contact hearing system 110 may include one or more external communication and control devices such as, for example, a cell phone (not shown).

Figure 3:
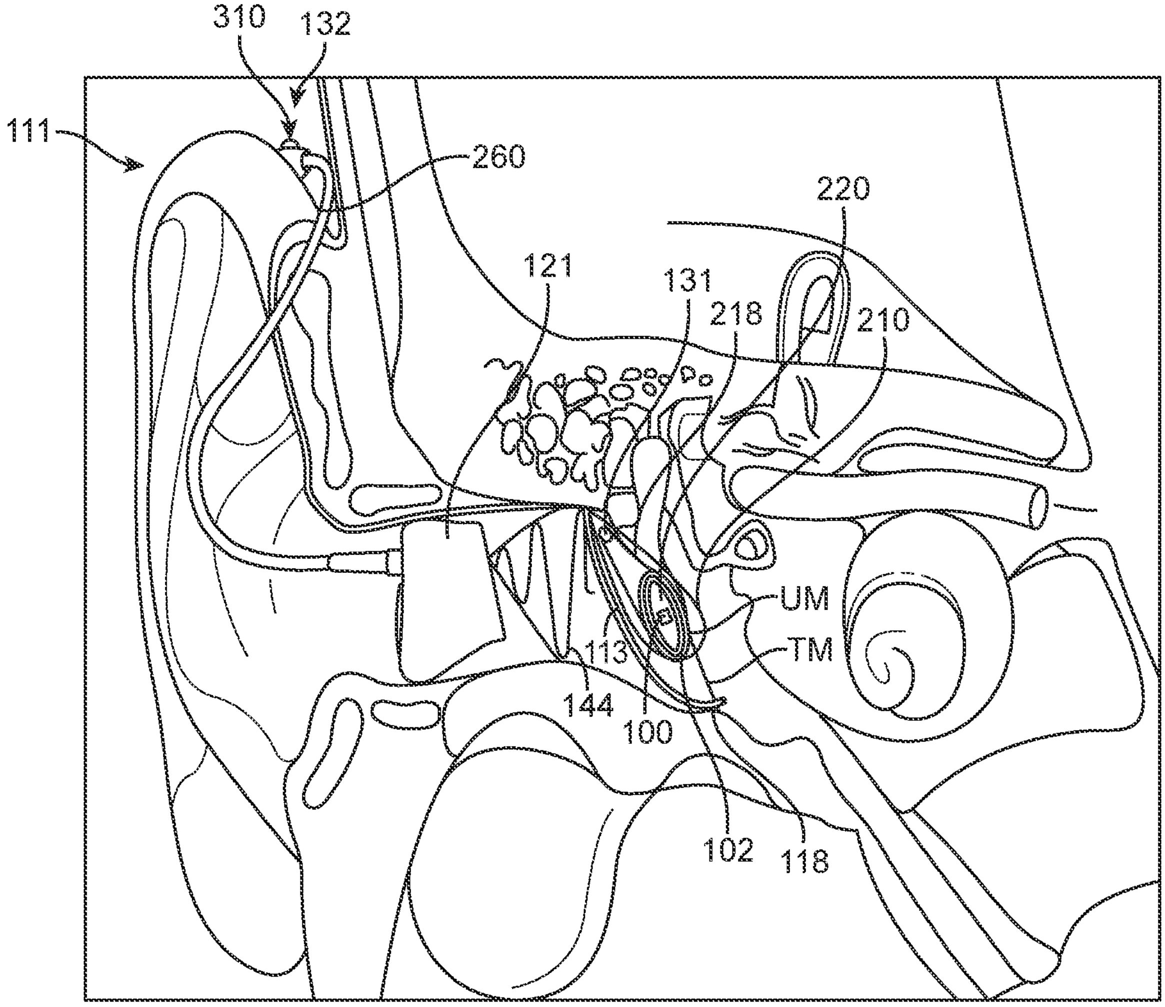
FIG. 3 is a cutaway view of an ear canal showing an optically coupled contact hearing system according to the present invention wherein at least a portion of the contact hearing system is positioned in the ear canal.

FIG. 3 is a cutaway view of an ear canal showing an optically coupled contact hearing system 111 for use in systems and methods according to the present invention, wherein at least a portion of the optically coupled contact hearing system 111 is positioned in the ear canal. In embodiments of the invention, optically coupled contact hearing system 111 may be referred to as a smart lens system or smart lens. In embodiments of the invention, optically coupled contact hearing system 111 may comprise a contact hearing system using light waves to transmit information and/or power from optical ear tip 121 to optically coupled contact hearing device 113. In embodiments of the invention optically coupled contact hearing device 113 may be referred to as: a contact hearing device; an optically coupled contact hearing device; a unibody floating contact hearing device; or unibody floating magnet contact hearing device. In embodiments of the invention, optically coupled contact hearing system 111 may comprise a contact hearing system using optical coupling to transmit information and/or power from optical ear tip 121 to inductively coupled contact hearing device 113. In FIG. 3, optically coupled contact hearing system 111 includes audio processor 132, which audio processor may include at least one external microphone 310. Audio processor 132 may be connected to optical ear tip 121 by cable 260, which may be adapted to transmit signals from audio processor 132 to optical ear tip 121. Optical ear tip 121 may further include canal microphone 312 and at least one acoustic vent 338. Optical ear tip 121 may be an ear tip which radiates light signal 144 in response to signals from audio processor 132. Light signal 144 radiated by optical ear tip 121 may be received by optically coupled contact hearing device 113, which may comprise photodetector 131, drive wires 218, umbo platform 220, magnet 100, cantilever support 210 and drive coil 102. Optical light tip 121 is adapted to radiate light signal 144 to optically coupled contact hearing device 113 which is positioned on a user's tympanic membrane TM in a manner which allows it to drive the user's umbo UM directly.

Figure 4:
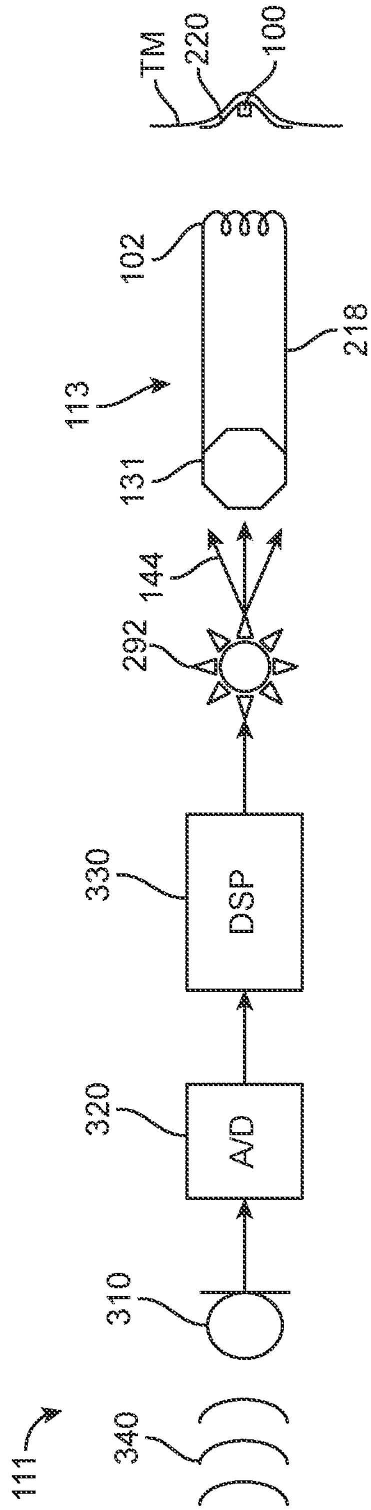
FIG. 4 is a block diagram of an inductively coupled contact hearing system according to the present invention.

FIG. 4 is a block diagram of an optically coupled contact hearing system 111 for use in methods and apparatus according to the present invention. In embodiments of the invention, at least a portion of optically coupled contact hearing system 111 is positioned in the ear canal of a user. In FIG. 4, ambient sound 340 may be received by external microphone 310 of audio processor 132, which then processes the received sound by passing it through processing circuitry, which may include analog to digital converter 320 and digital signal processor 330. The output of audio processor 132 may be transmitted to a laser 292 by cable 260. Signals transmitted to laser 292 may then be transmitted to optically coupled contact hearing device 113 by, for example, causing laser 292 to radiate light signal 144. In embodiments of the invention, optically coupled contact hearing device 113 may include photodetector 131, drive coil 102, umbo platform 220 and magnet 100. Information contained in light signal 144 received by photodetector 131 may be transmitted to drive coil 102, which drives magnet 100, thereby moving umbo platform 220. In embodiments of the invention, the signal transmitted to optical ear tip 121 may be a signal representative of audio signals received by external microphone 310 which may then be transmitted to optically coupled contact hearing device 113. In embodiments of the invention, optically coupled contact hearing system 111 may include one or more external communication and control devices such as, for example, a cell phone (not pictured).

Figure 5:
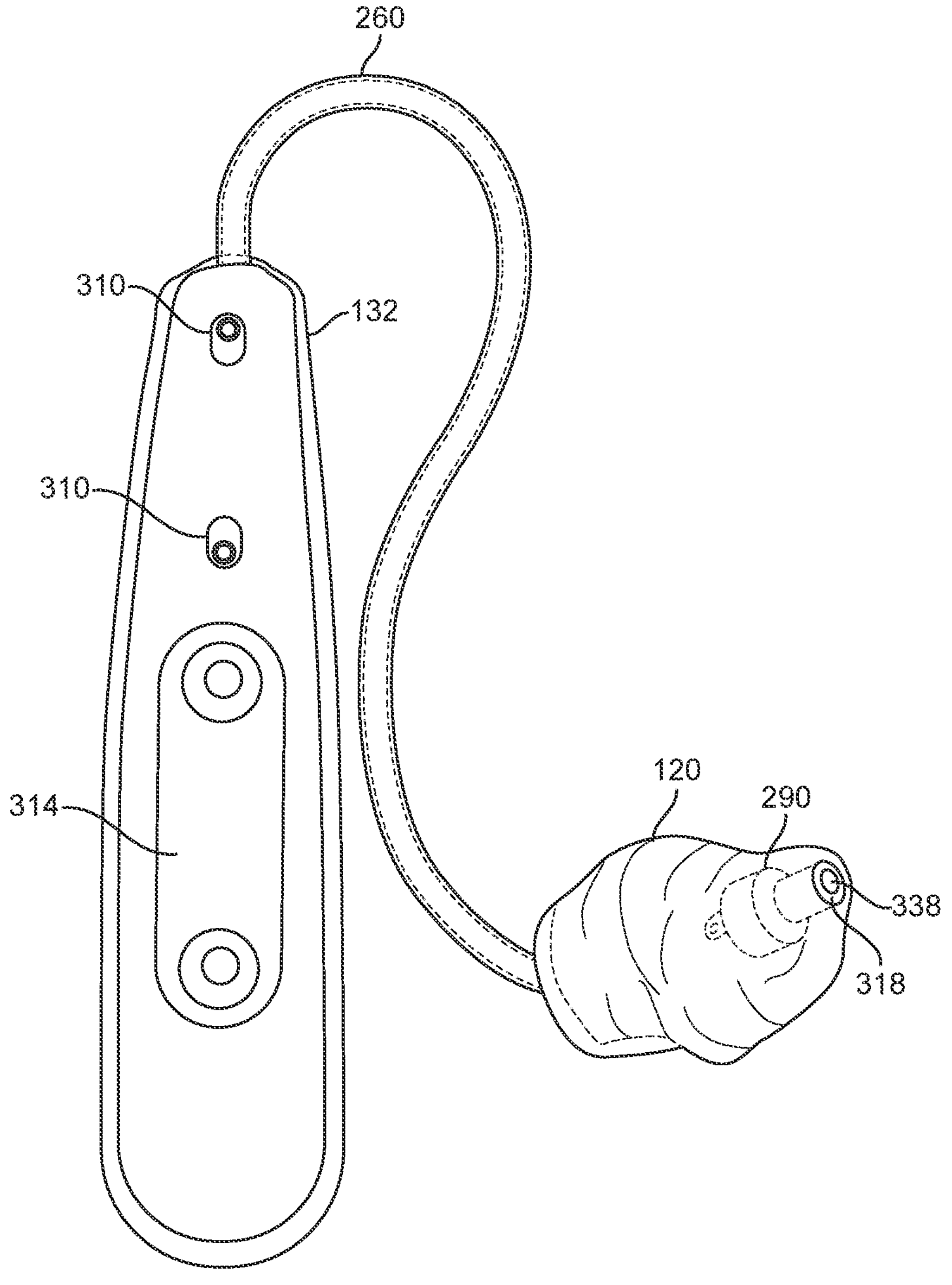
FIG. 5 illustrates a processor and ear tip according to the present invention

FIG. 5 illustrates an audio processor 132 and inductive ear tip 120 according to the present invention. Inductive ear tip 120 may, in some embodiments of the invention, be referred to as a mag tip or magnetic tip. In embodiments of the invention inductive ear tip 120 may be replaced with alternative ear tips, such as, for example, an optical ear tip 121. In the embodiment of FIG. 5, audio processor 132 may include external microphones 310 and volume/control switch 314. In embodiments of the invention, inductive ear tip 120 may include a transmit coil 290 which may include ferrite core 318. In embodiments of the invention, an optical ear tip 121 may include laser 292. In embodiments of the invention, inductive ear tip 120 may include an acoustic vent which may pass through transmit coil 290 and/or through ferrite core 318.

Figure 6:
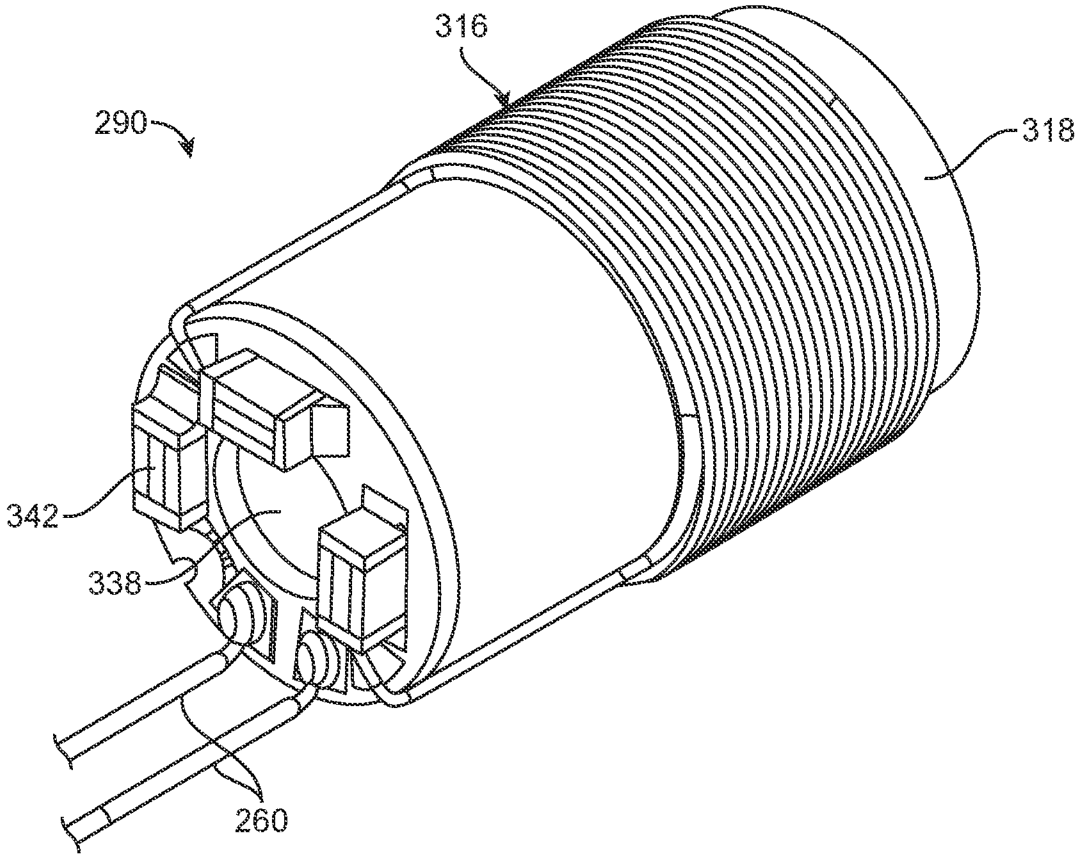
FIG. 6 is a side perspective view of a transmit coil for use in an ear tip according to the present invention.

FIG. 6 is a side perspective view of a transmit coil 290 for use in an inductive ear tip 120 according to the present invention. In the embodiment of FIG. 6, transmit coil 290 includes coil winding 316 which is wound around ferrite core 318. In embodiments of the invention, transmit coil 290 may further include acoustic vent 338. In embodiments of the invention, transmit coil 290 may further include transmit electronics 342. In embodiments of the invention, transmit coil 290 may be connected to audio processor 132 by cable 260.

Figure 7:
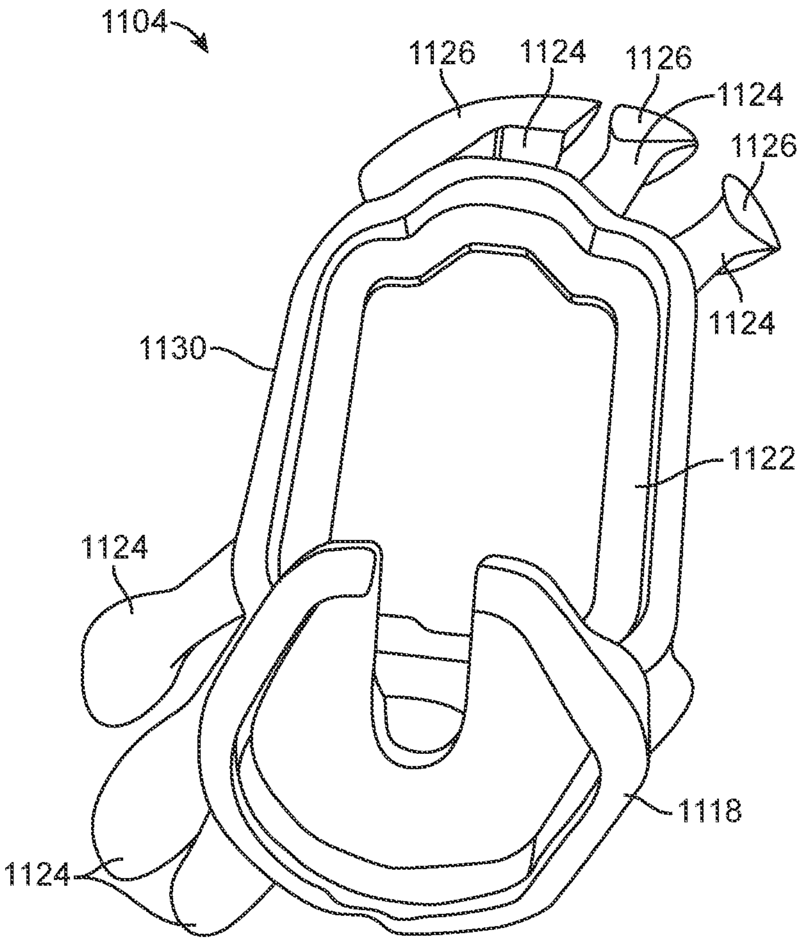
FIG. 7 is a top perspective view of a direct print chassis according to one embodiment of the present invention.

FIG. 7 is a top perspective view of a direct print chassis 1104 according to one embodiment of the present invention. In FIG. 7, direct print chassis 1104 includes central frame 1130 and motor mount pocket 1122. Extending from central frame 1130 may be anchor arms 1124 and receiver mount 1118. Anchor arms 1124 may include anchor surfaces 1126.

Figure 8:
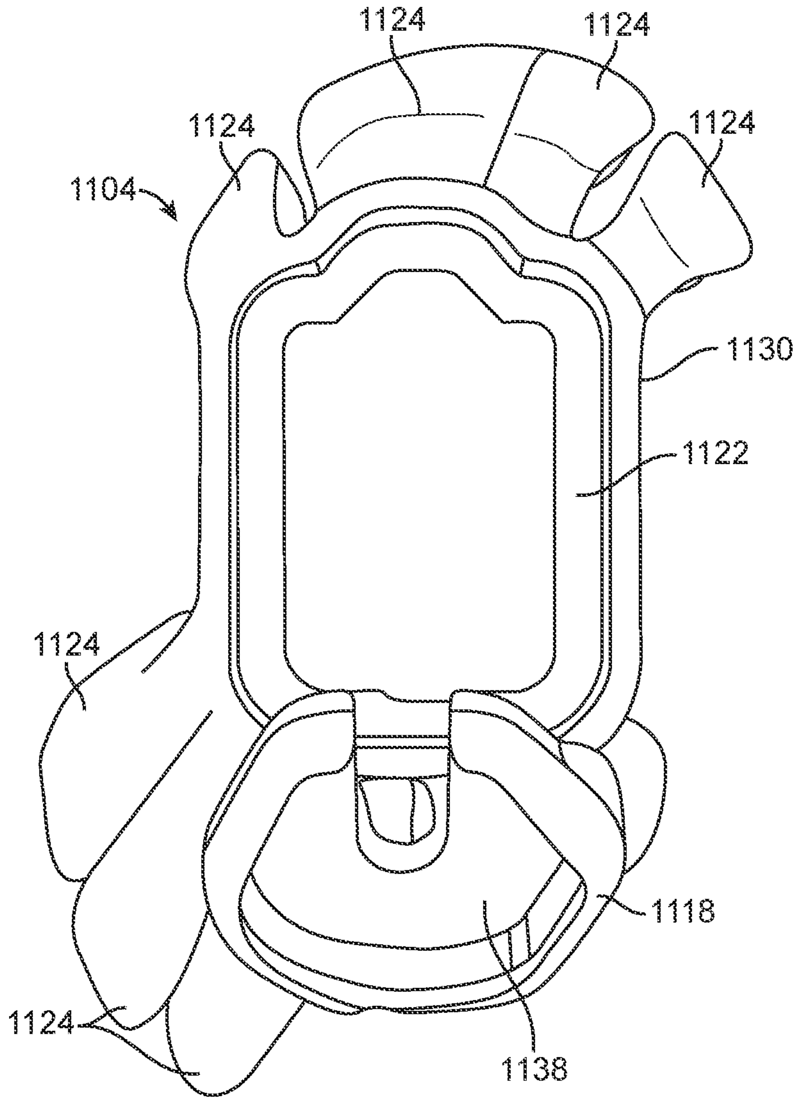
FIG. 8 is a top view of a direct print chassis according to one embodiment of the present invention.

FIG. 8 is a top view of a direct print chassis according to one embodiment of the present invention. In FIG. 8, direct print chassis 1104 includes central frame 1130 and motor mount pocket 1122. Extending from central frame 1130 may be anchor arms 1124 and receiver mount 1118. Anchor arms 1124 may include anchor surfaces 1126. Receiver mount 1118 may include mounting surface 1138.

Figure 9:
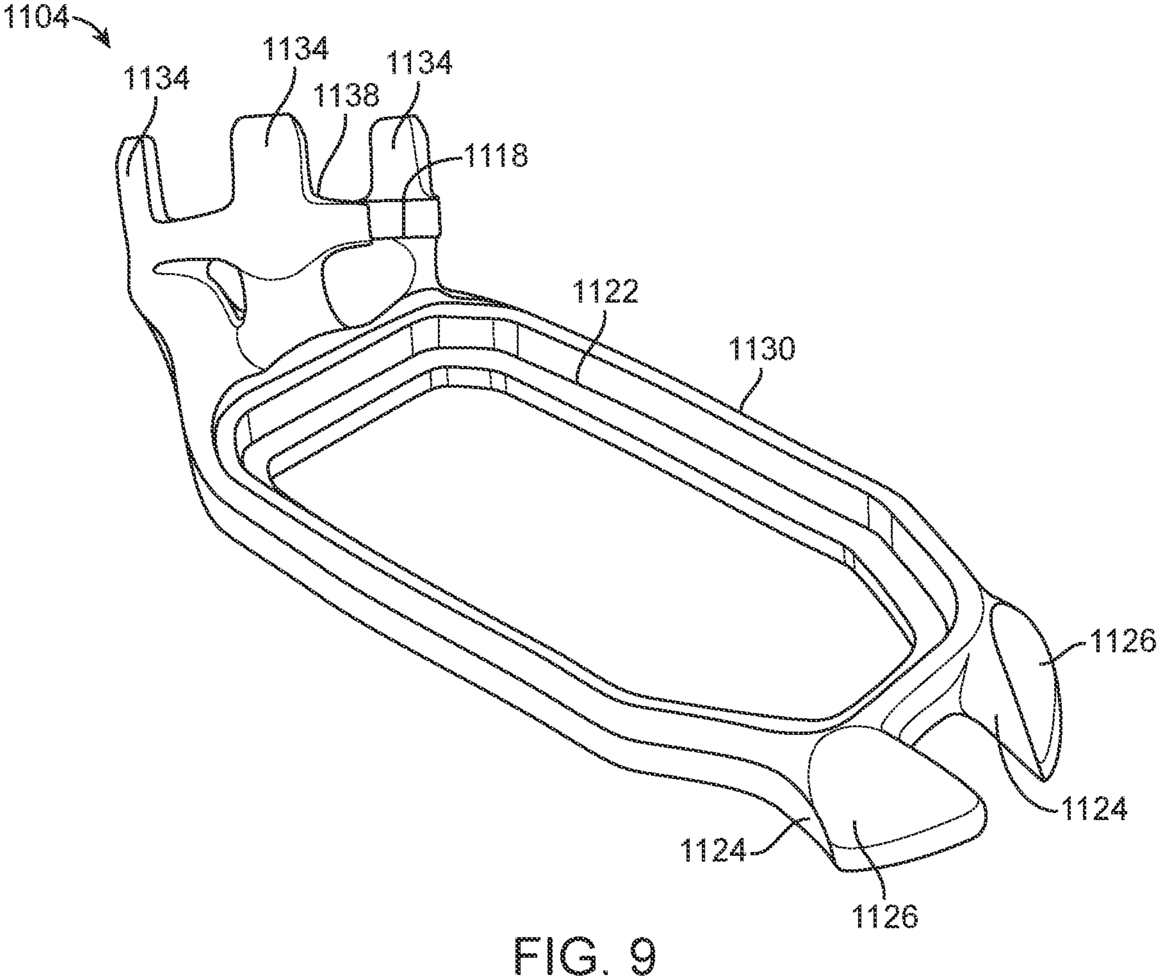
FIG. 9 is a side perspective view of a direct print chassis according to one embodiment of the present invention.

FIG. 9 is a side perspective view of a direct print chassis according to one embodiment of the present invention. In FIG. 9, direct print chassis 1104 includes central frame 1130 and motor mount pocket 1122. Extending from central frame 1130 may be anchor arms 1124 and receiver mount 1118. Anchor arms 1124 may include anchor surfaces 1126. Receiver mount 1118 may include mounting fingers 1134 and mounting surface 1138.

Figure 10:
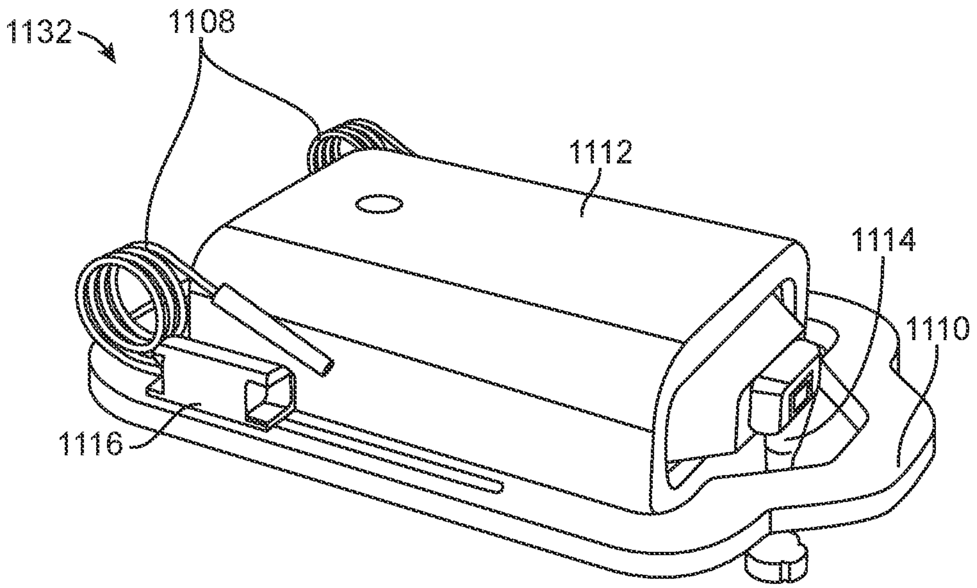
FIG. 10 is a side perspective view of a motor assembly according to one embodiment of the present invention.

FIG. 10 is a side perspective view of a motor assembly 1132 according to one embodiment of the present invention. In FIG. 10, motor assembly 1132 includes motor mount 1110, microactuator 1112, springs 1108, and molded sliders 1116. Microactuator 1112 may be connected to drive post 1114.

Figure 11:
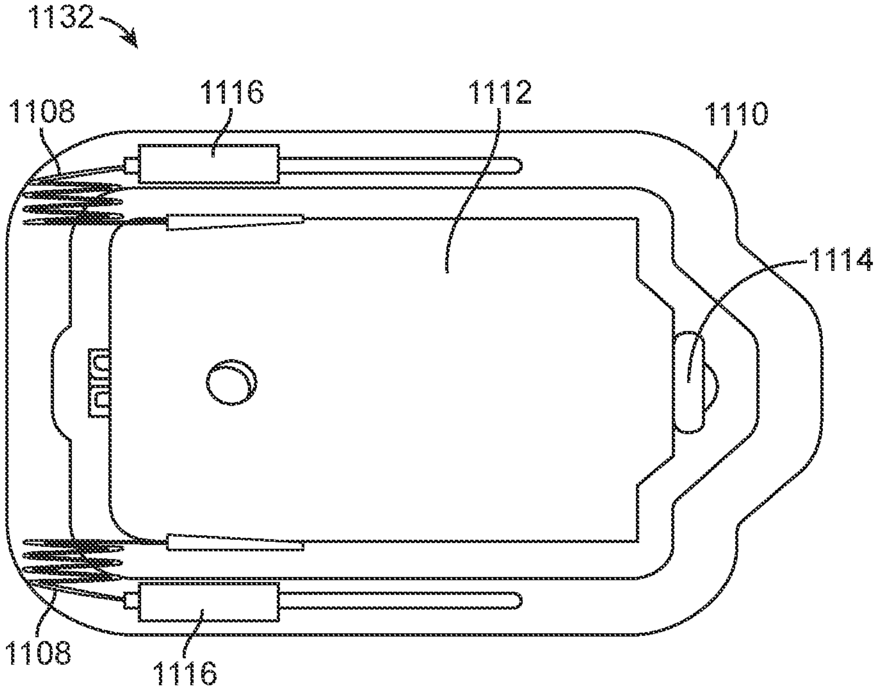
FIG. 11 is a top view of a motor assembly according to one embodiment of the present invention.

FIG. 11 is a top view of a motor assembly 1132 according to one embodiment of the present invention. In FIG. 11, motor assembly 1132 includes motor mount 1110, microactuator 1112, springs 1108, and molded sliders 1116. Microactuator 1112 may be connected to drive post 1114.

Figure 12:
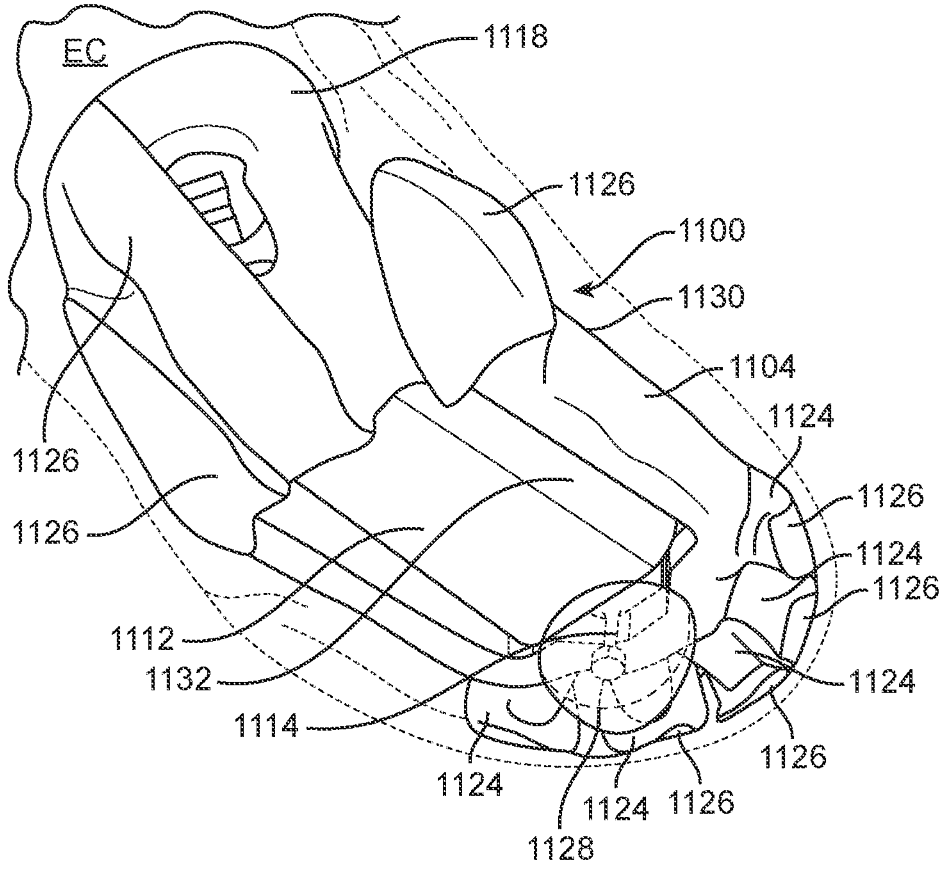
FIG. 12 is a bottom perspective view of a contact hearing device according to one embodiment of the present invention, wherein the contact hearing device is illustrated positioned in the ear canal of a user.

FIG. 12 is a bottom perspective view of a contact hearing device 1100 according to one embodiment of the present invention, wherein the contact hearing device is illustrated as it would be positioned in the ear canal of a user. In FIG. 12, contact hearing device 1100 includes direct print chassis 1104 and motor assembly 1132. In FIG. 12, direct print chassis 1104 includes central frame 1130. Extending from central frame 1130 may be anchor arms 1124 and receiver mount 1118. Anchor arm 1124 may include anchor surfaces 1126. In FIG. 6, motor assembly 1132 includes microactuator 1112. Microactuator 1112 may be connected to drive post 1114 which may be connected to umbo platform 1128.

Figure 13:
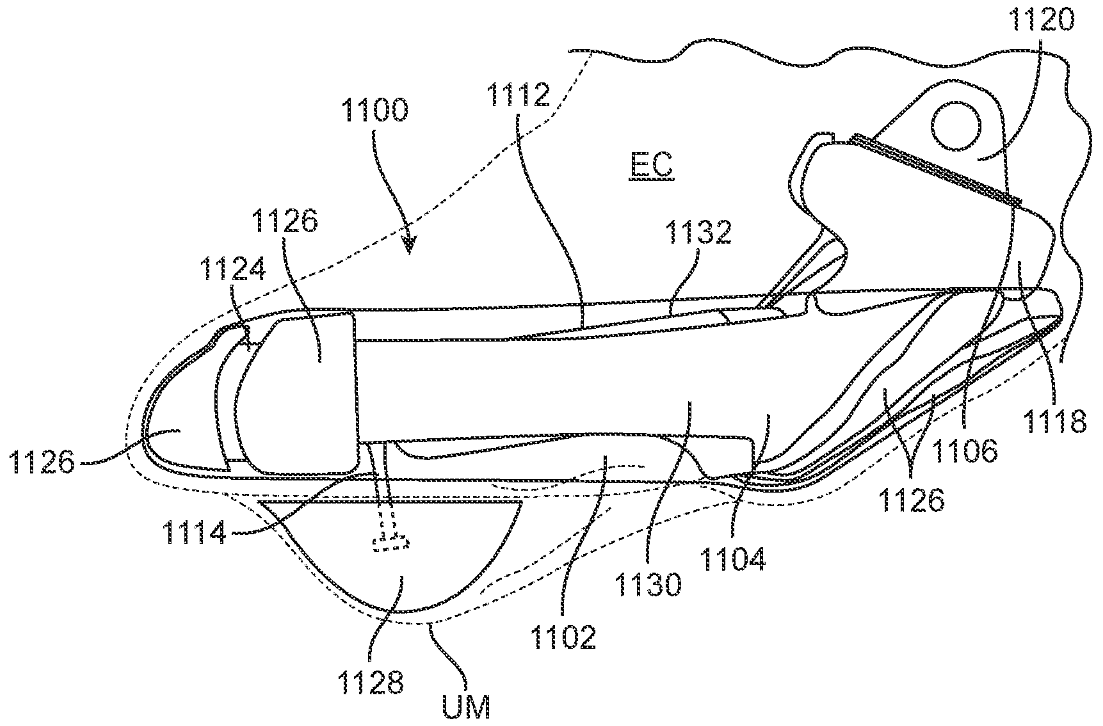
FIG. 13 is a side view of a contact hearing device according to one embodiment of the present invention, wherein the contact hearing device is illustrated positioned in the ear canal of a user.

FIG. 13 is a side view of a contact hearing device 1100 according to one embodiment of the present invention, wherein the contact hearing device is illustrated as it would be positioned in the ear canal of a user. In FIG. 13, contact hearing device 1100 includes direct print chassis 1104 and motor assembly 1132. In FIG. 13, direct print chassis 1104 includes central frame 1130. Extending from central frame 1130 may be anchor arms 1124 and receiver mount 1118. Anchor arms 1124 may include anchor surfaces 1126. In FIG. 13, motor assembly 1132 includes microactuator 1112. Microactuator 1112 may be connected to drive post 1114 which may be connected to umbo platform 1128. In FIG. 13, a receive coil 1106 is mounted in receiver mount 1118. In FIG. 13, contact hearing device 1100 further includes grasping tab 1120.

Figure 14:
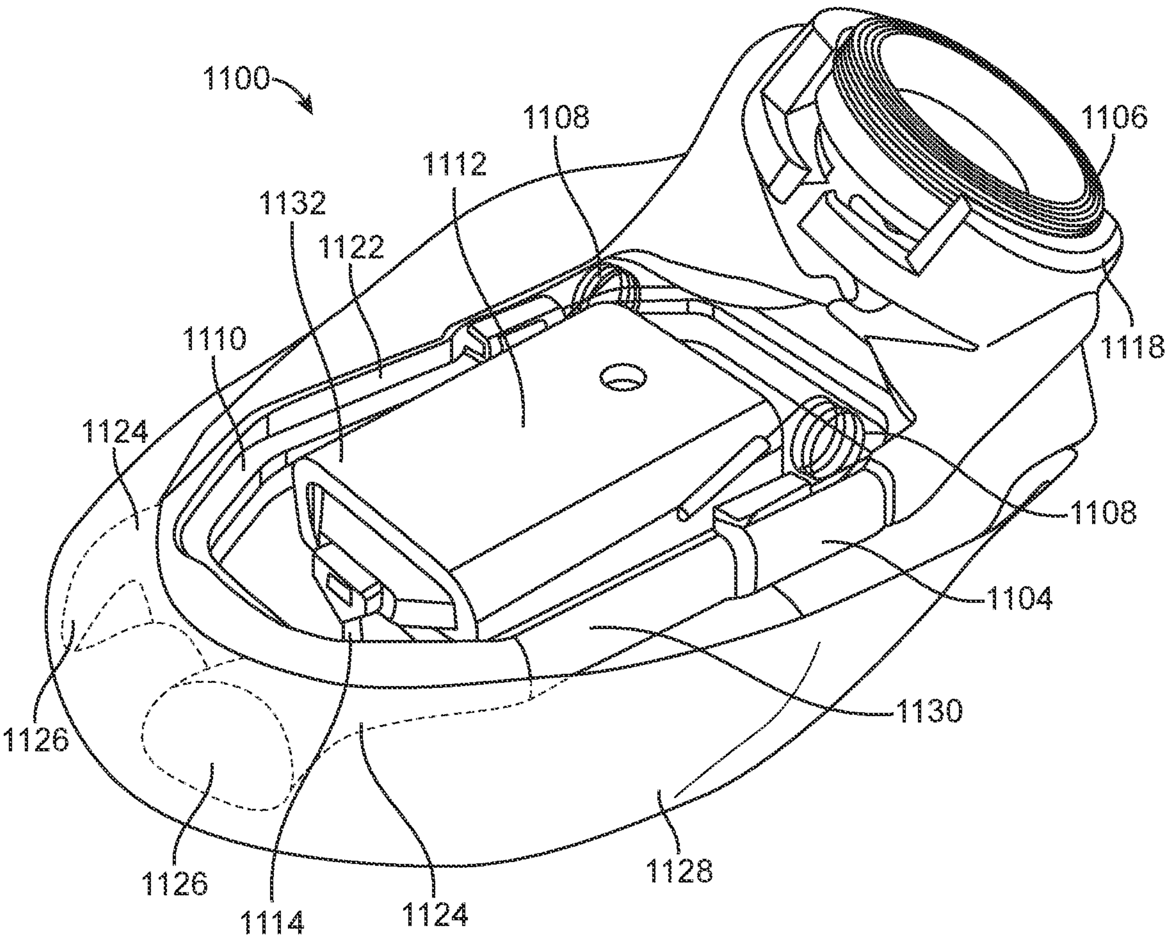
FIG. 14 is a top perspective view of a contact hearing device according to one embodiment of the present invention.

FIG. 14 is a top perspective view of a contact hearing device 1100 according to one embodiment of the present invention. In FIG. 14, contact hearing device 1100 includes direct print chassis 1104 and motor assembly 1132. In FIG. 14, direct print chassis 1104 includes central frame 1130 and motor mount pocket 1122. Extending from central frame 1130 may be anchor arms 1124 and receiver mount 1118. Anchor arms 1124 may include anchor surfaces 1126. In FIG. 14, motor assembly 1132 includes motor mount 1110, microactuator 1112, and springs 1108. Microactuator 1112 may be connected to drive post 1114. In FIG. 14, a receive coil 1106 is mounted in receiver mount 1118.

Figure 15:
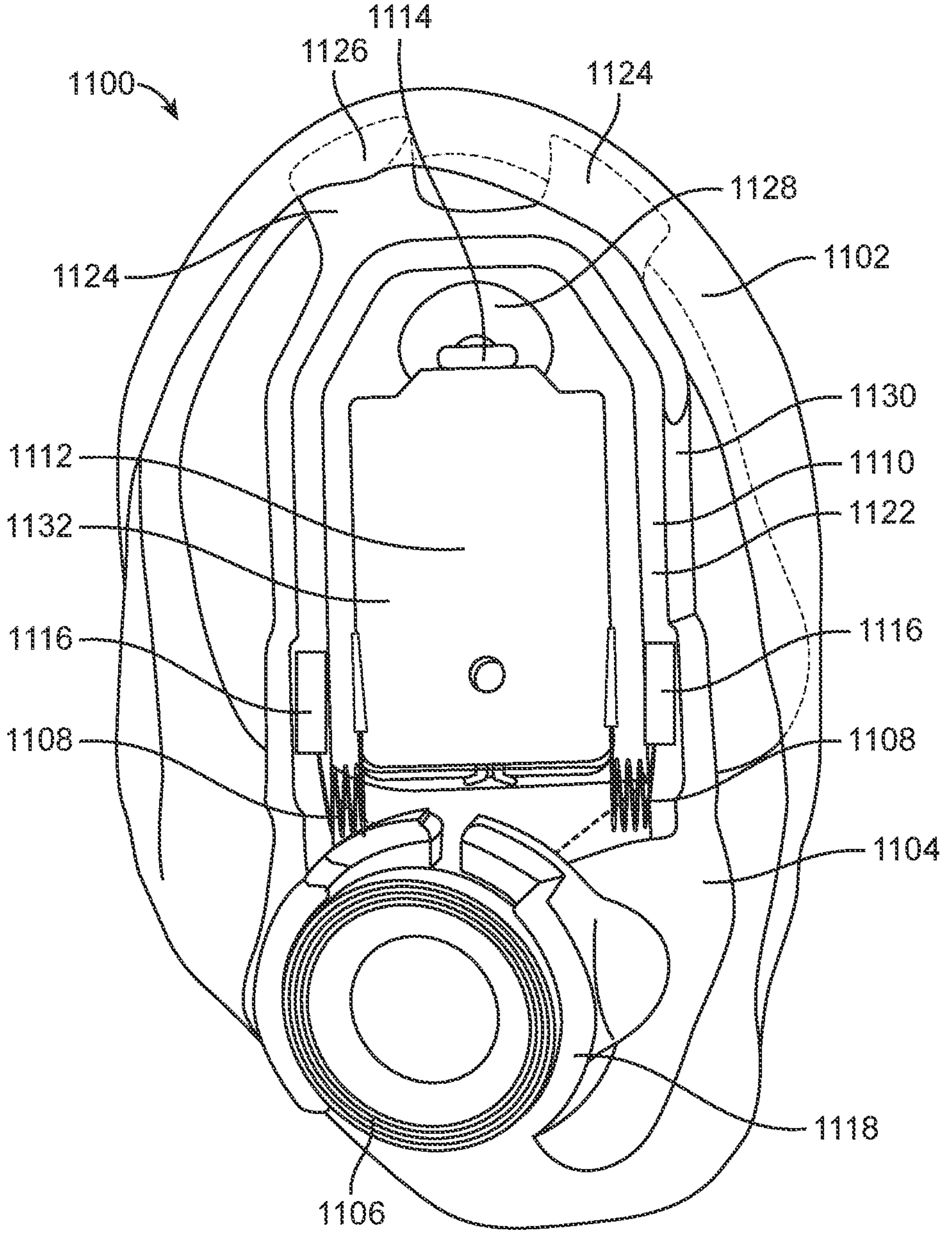
FIG. 15 is a top view of a contact hearing device according to one embodiment of the present invention.

FIG. 15 is a top view of a contact hearing device according to one embodiment of the present invention. In FIG. 15, contact hearing device 1100 includes direct print chassis 1104 and motor assembly 1132. In FIG. 15, direct print chassis 1104 includes central frame 1130 and motor mount pocket 1122. Extending from central frame 1130 may be anchor arms 1124 and receiver mount 1118. Anchor arms 1124 may include anchor surfaces 1126. In FIG. 15, motor assembly 1132 includes motor mount 1110, microactuator 1112, springs 1108, and molded sliders 1116. Microactuator 1112 may be connected to drive post 1114, which is connected to umbo platform 1128. In FIG. 15, receive coil 1106 is mounted in receiver mount 1118.

Figure 16:
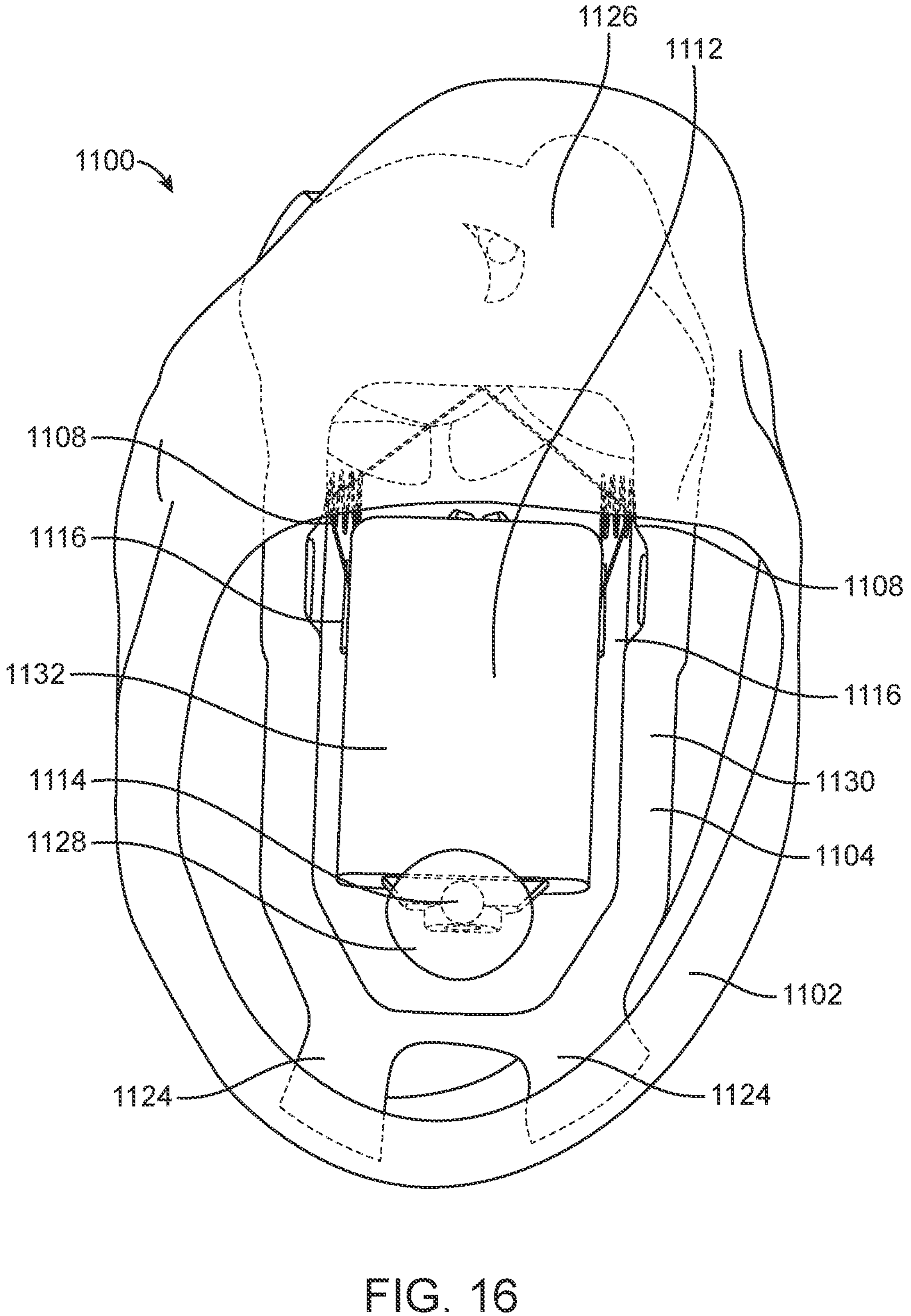
FIG. 16 is a bottom view of a contact hearing device according to one embodiment of the present invention.

FIG. 16 is a bottom view of a contact hearing device according to one embodiment of the present invention. In FIG. 16, contact hearing device 1100 includes direct print chassis 1104 and motor assembly 1132. In FIG. 16, direct print chassis 1104 includes central frame 1130. Extending from central frame 1130 may be anchor arms 1124 and receiver mount 1118. Anchor arms 1124 may include anchor surfaces 1126. In FIG. 16, motor assembly 1132 includes motor mount 1110, microactuator 1112, springs 1108, and molded sliders 1116. Microactuator 1112 may be connected to drive post 1114, which is connected to umbo platform 1128. In FIG. 16, receive coil 1106 is mounted in receiver mount 1118.

Figure 17:
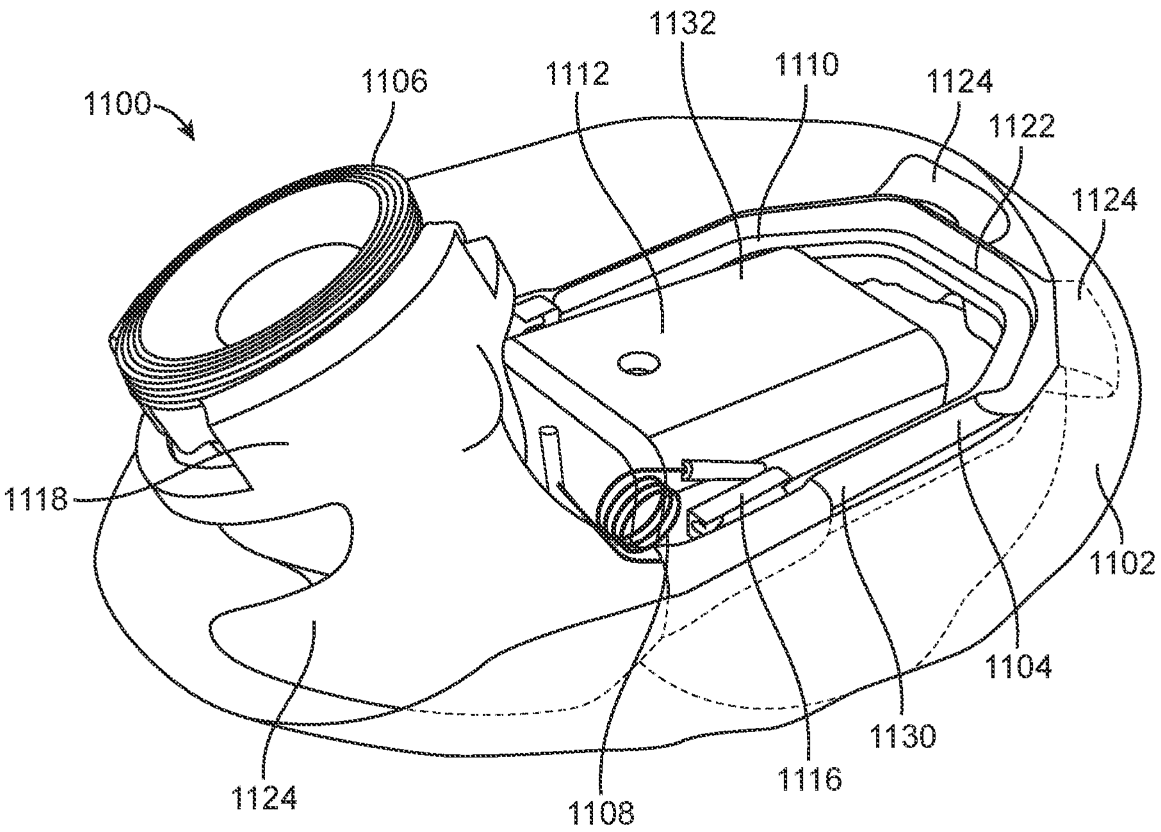
FIG. 17 is a side perspective view of a contact hearing device according to one embodiment of the present invention.

FIG. 17 is a side perspective view of a contact hearing device 1100 according to one embodiment of the present invention. In FIG. 17, contact hearing device 1100 includes direct print chassis 1104 and motor assembly 1132. In FIG. 17, direct print chassis 1104 includes central frame 1130 and motor mount pocket 1122. Extending from central frame 1130 may be anchor arms 1124 and receiver mount 1118. In FIG. 16, motor assembly 1132 includes motor mount 1110, microactuator 1112, springs 1108, and molded sliders 1116. Microactuator 1112 may be connected to drive post 1114, which is connected to umbo platform 1128. In FIG. 16, receive coil 1106 is mounted in receiver mount 1118.

Figure 18:
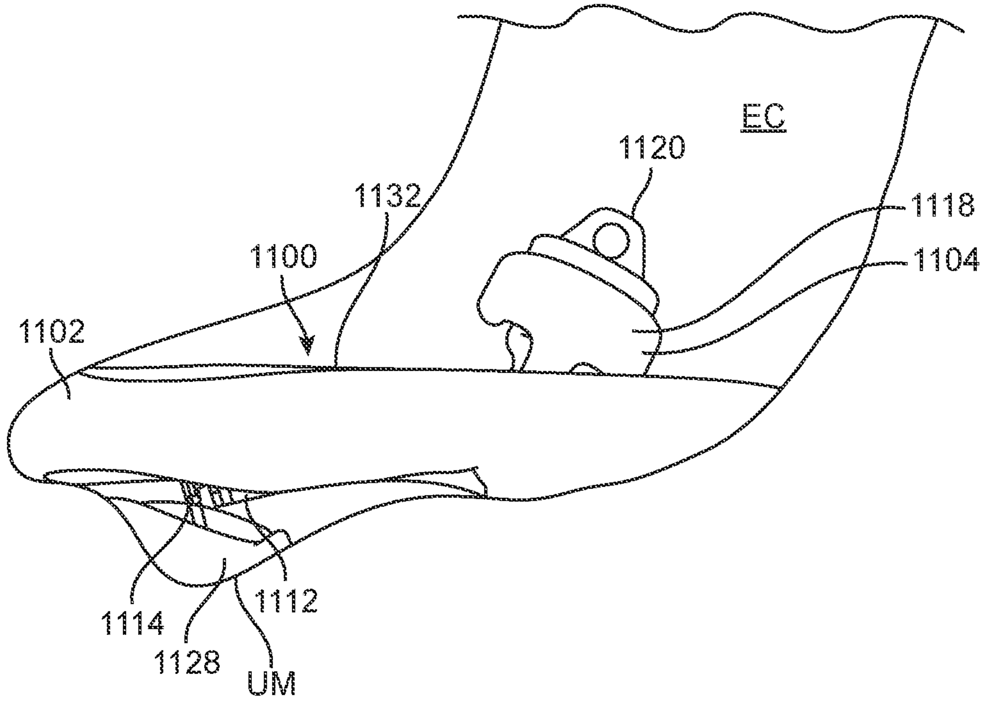
FIG. 18 is a side view of a contact hearing device according to one embodiment of the present invention, wherein the contact hearing device is illustrated positioned in the ear canal of a user.

FIG. 18 is a side view of a contact hearing device 1100 according to one embodiment of the present invention, wherein the contact hearing device is illustrated as it would be positioned in the ear canal of a user. In FIG. 18, contact hearing device 1100 includes direct print chassis 1104 and motor assembly 1132. In FIG. 18, direct print chassis 1104 includes receiver mount 1118. Anchor arms 1124 may include anchor surfaces 1126. In FIG. 18, motor assembly 1132 includes microactuator 1112 which is connected to drive post 1114. Drive post 1114 is connected to umbo platform 1128.

Figure 19:
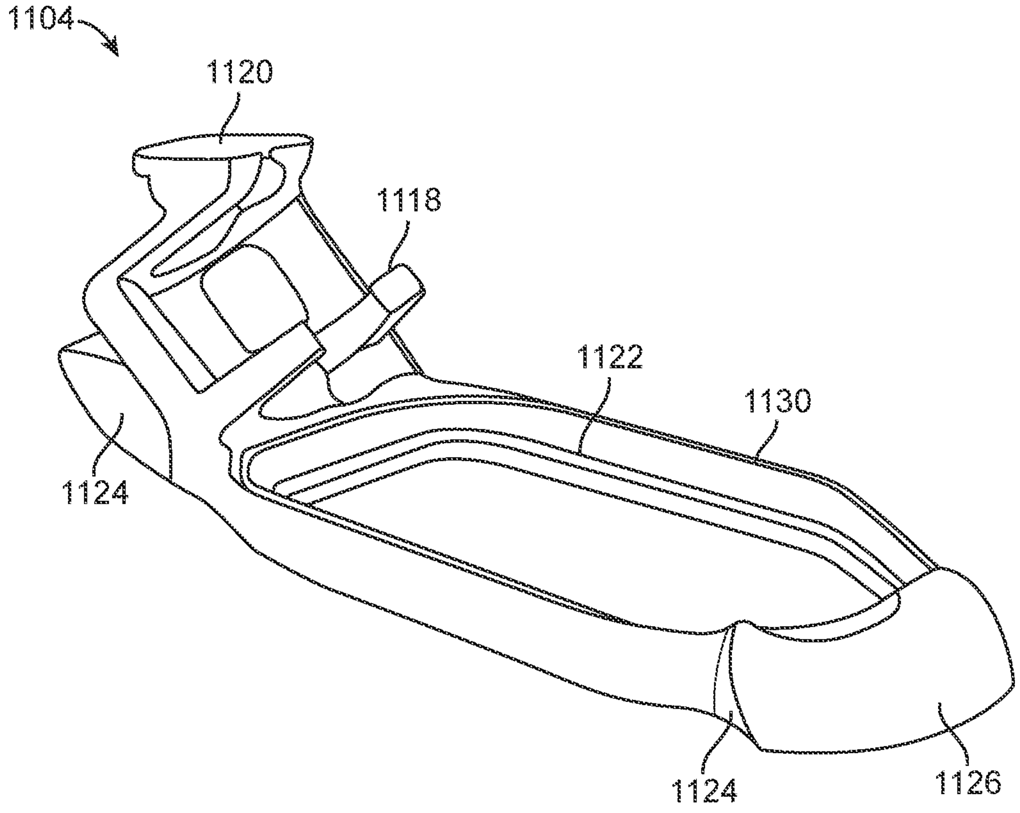
FIG. 19 is a side perspective view of a direct print chassis according to one embodiment of the present invention.

FIG. 19 is a side perspective view of a direct print chassis according to one embodiment of the present invention. In FIG. 19, direct print chassis 1104 includes central frame 1130 and motor mount pocket 1122. Extending from central frame 1130 may be anchor arms 1124, grasping tab 1120, and receiver mount 1118. Anchor arms 1124 may include anchor surfaces 1126.

Figure 20:
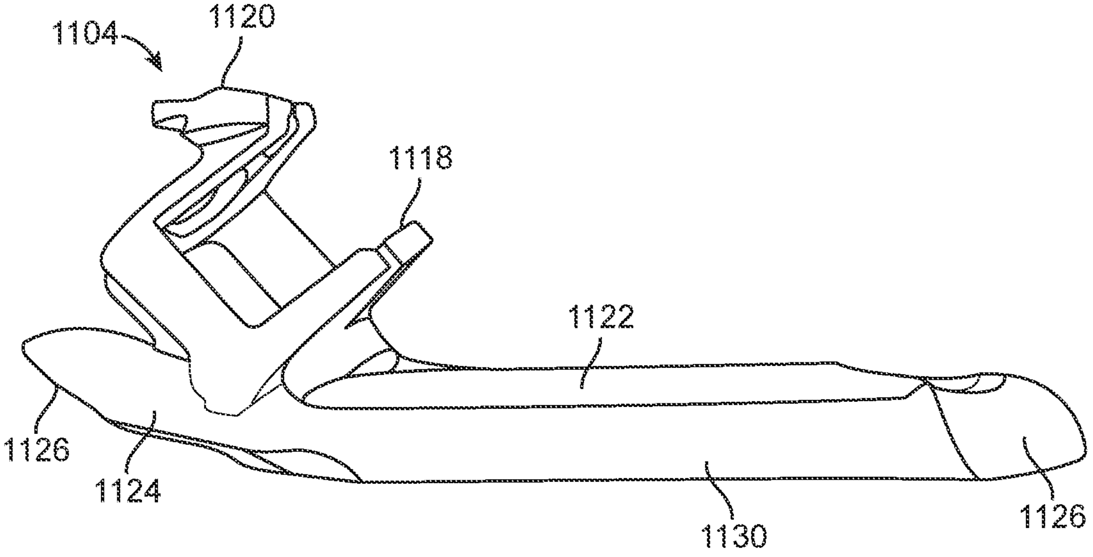
FIG. 20 is a side view of a direct print chassis according to one embodiment of the present invention.

FIG. 20 is a side view of a direct print chassis according to one embodiment of the present invention. In FIG. 20, direct print chassis 1104 includes central frame 1130 and motor mount pocket 1122. Extending from central frame 1130 may be anchor arms 1124, grasping tab 1120, and receiver mount 1118. Anchor arms 1124 may include anchor surfaces 1126.

Figure 21:
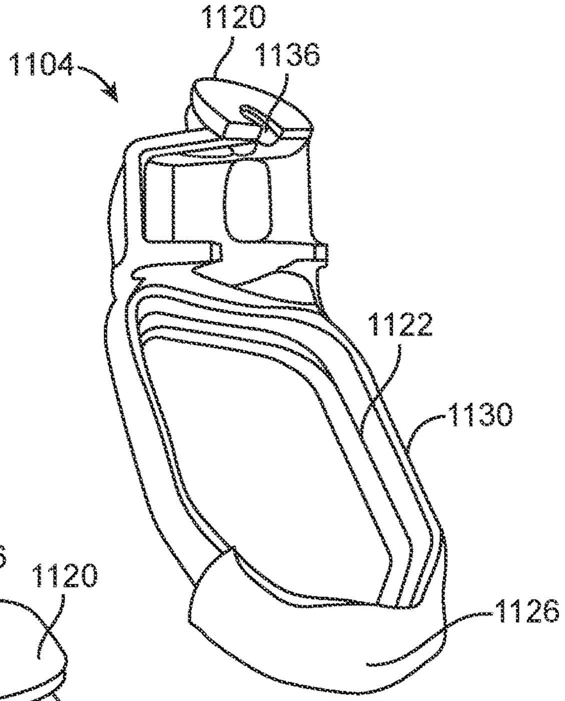
FIG. 21 is a top perspective view of a direct print chassis according to one embodiment of the present invention.

FIG. 21 is a top perspective view of a direct print chassis according to one embodiment of the present invention. In FIG. 21, direct print chassis 1104 includes central frame 1130 and motor mount pocket 1122. Extending from central frame 1130 may be anchor arms 1124, grasping tab 1120, and receiver mount 1118. Anchor arms 1124 may include anchor surfaces 1126.

Figure 22:
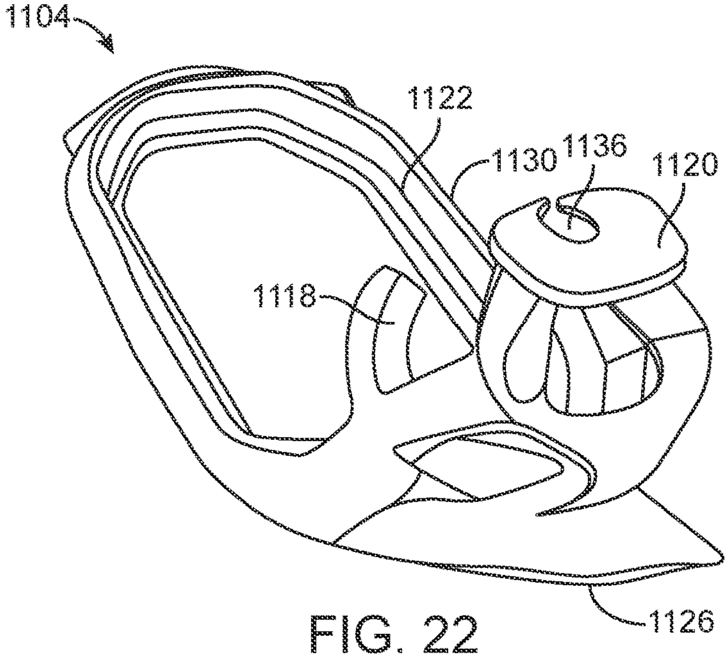
FIG. 22 is a top perspective view of a direct print chassis according to one embodiment of the present invention.

FIG. 22 is a top perspective view of a direct print chassis according to one embodiment of the present invention. In FIG. 22, direct print chassis 1104 includes central frame 1130 and motor mount pocket 1122. Extending from central frame 1130 may be anchor arms 1124, grasping tab 1120 and receiver mount 1118. Anchor arms 1124 may include anchor surfaces 1126.

Figure 23:
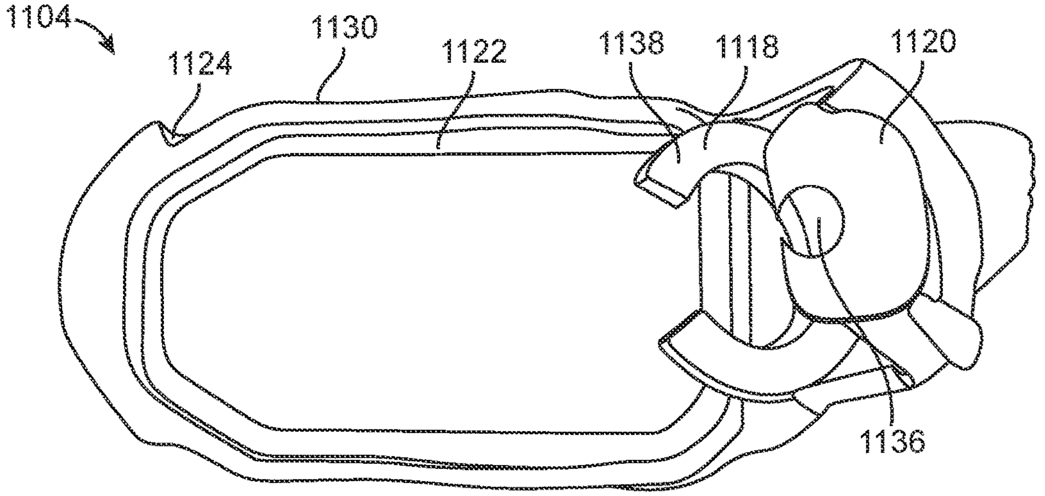
FIG. 23 is a top view of a direct print chassis according to one embodiment of the present invention.

FIG. 23 is a top view of a direct print chassis according to one embodiment of the present invention. In FIG. 23, direct print chassis 1104 includes central frame 1130 and motor mount pocket 1122. Extending from central frame 1130 may be anchor arms 1124, grasping tab 1120 and receiver mount 1118. Anchor arms 1124 may include anchor surfaces 1126. Receiver mount 1118 may include mounting surface 1138.

Figure 24:
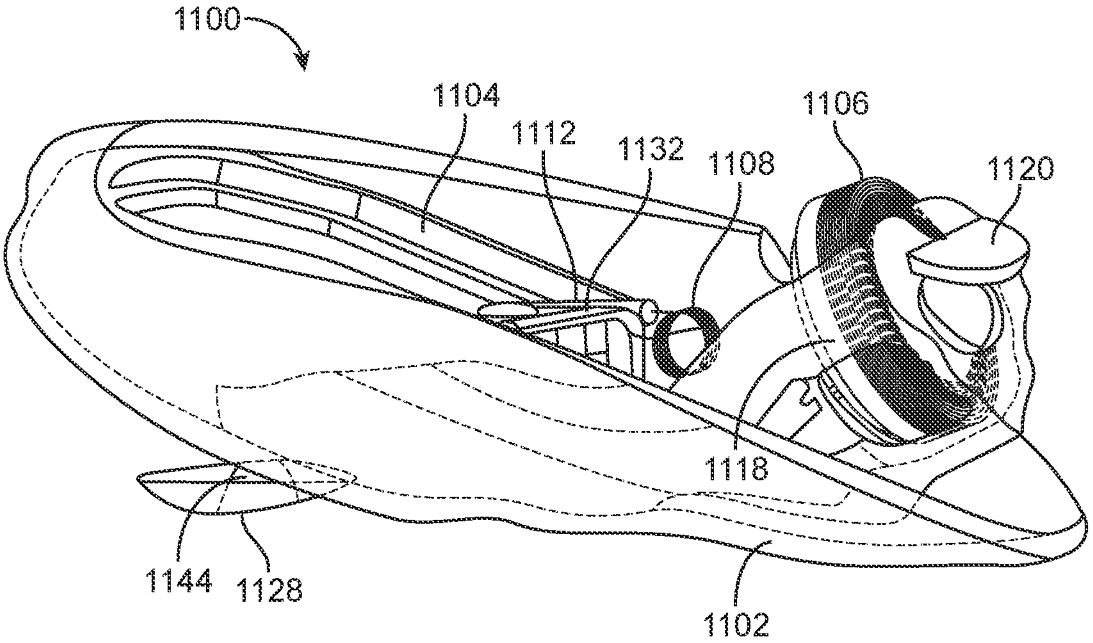
FIG. 24 is a side view of a contact hearing device according to one embodiment of the present invention.

FIG. 24 is a side view of a contact hearing device 1100 according to one embodiment of the present invention. In FIG. 24 contact hearing device 1100 may include direct print chassis 1104 and sulcus platform 1102. Motor assembly 1132 may include direct print chassis 1104, springs 1108 and microactuator 1112. Direct print chassis 1104 may include receiver mount 1118. Receive coil 1106 and grasping tab 1120 may be mounted on receiver mount 1118. Motor assembly 1132 may further include umbo platform 1128. Umbo platform 1128 may include drive post landing pad 1144.

Figure 25:
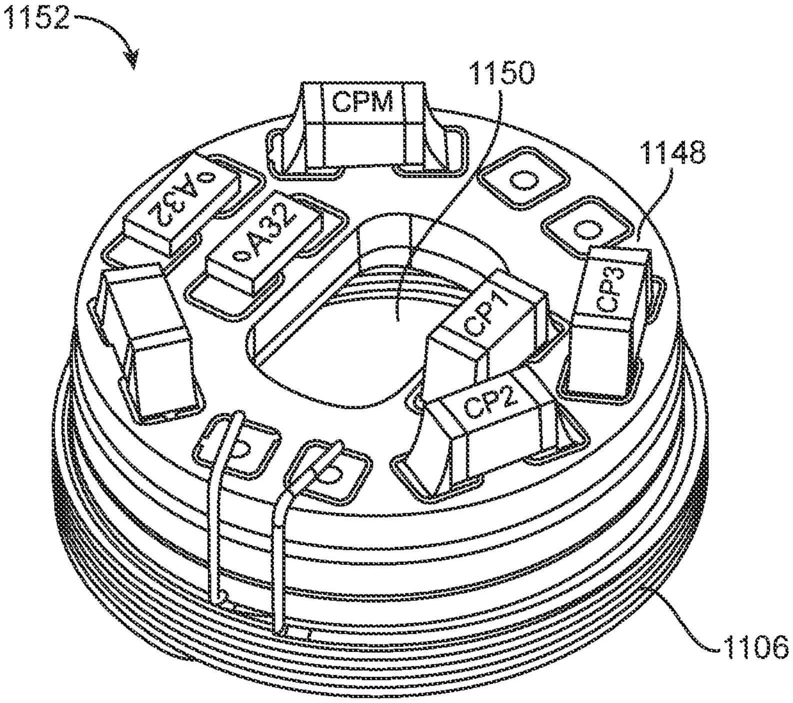
FIG. 25 is a perspective view of a receive coil including receive electronics for a contact hearing device according to one embodiment of the present invention.
Figure 26:
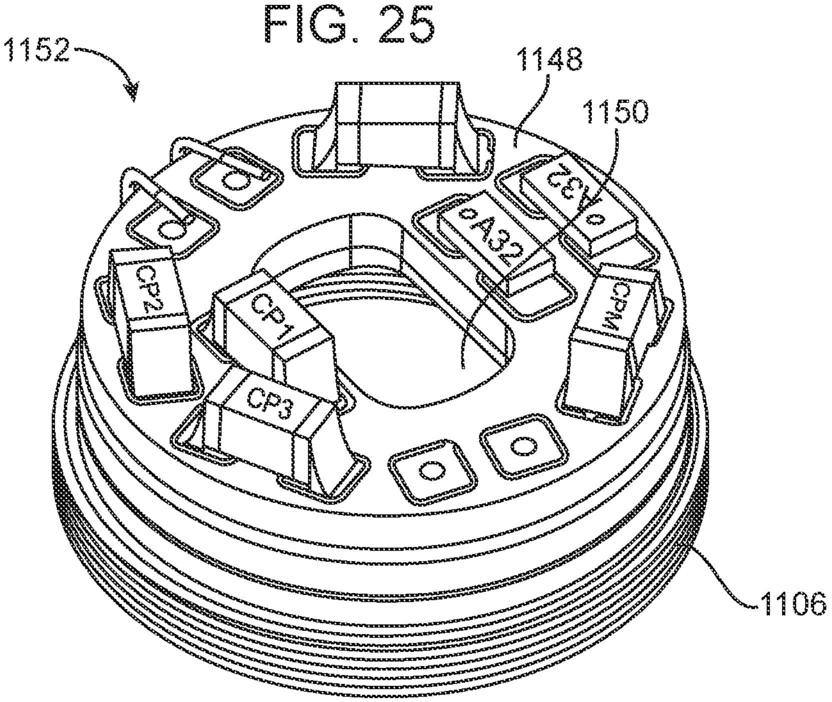
FIG. 26 is a perspective view of a receive coil including receive electronics for a contact hearing device according to one embodiment of the present invention.
Figure 27:
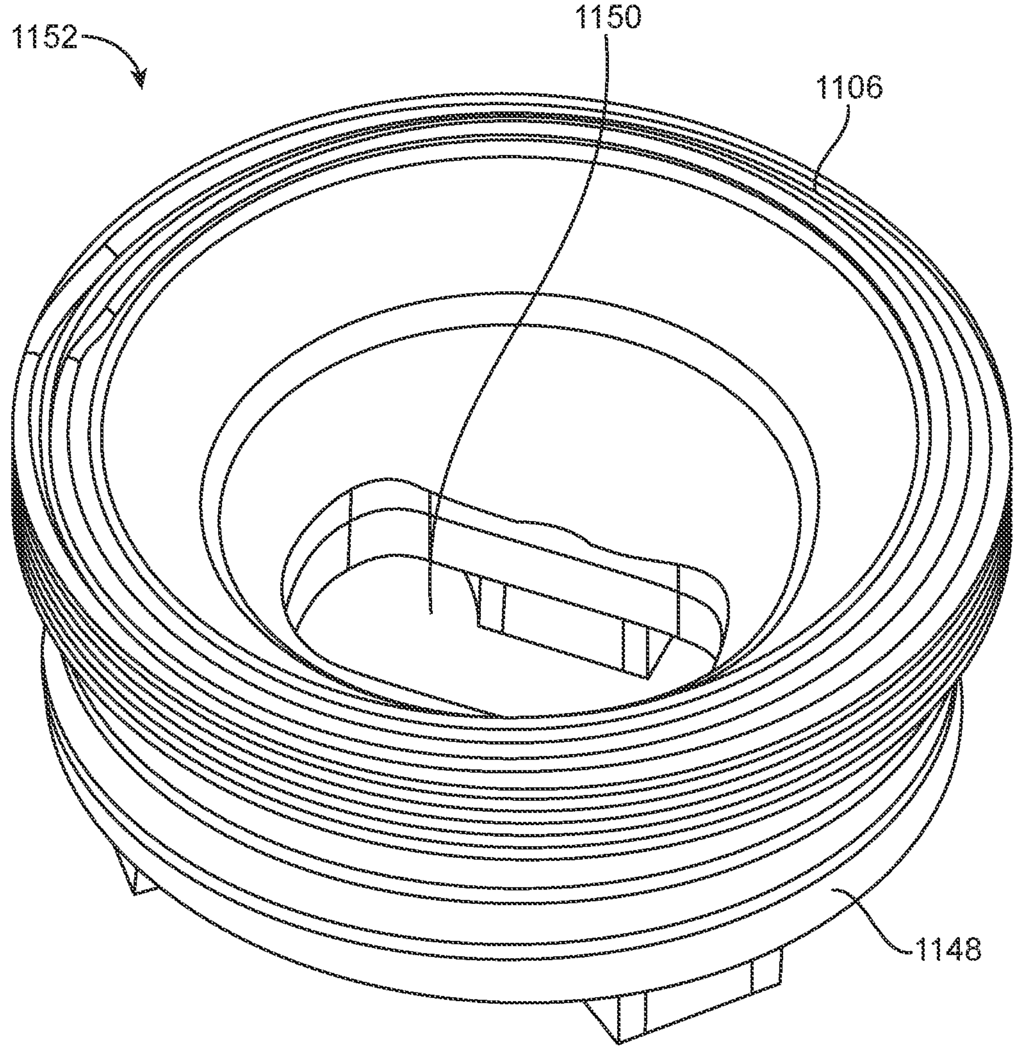
FIG. 27 is a perspective view of a receive coil including receive electronics for a contact hearing device according to one embodiment of the present invention.

FIG. 25 is a perspective view of a receive coil 1106 including receive electronics 1148 for a contact hearing device 1100 according to one embodiment of the present invention. FIG. 26 is a perspective view of a receive coil 1106 including receive electronics 1148 for a contact hearing device 1100 according to one embodiment of the present invention. FIG. 27 is a perspective view of a receive coil 1106 including receive electronics 1148 for a contact hearing device 1100 according to one embodiment of the present invention. In FIGS. 25, 26 and 27, receive coil assembly 1152 may include receive coil 1106, receive electronics 1148 and receive coil mounting slot 1150.

Figure 28:
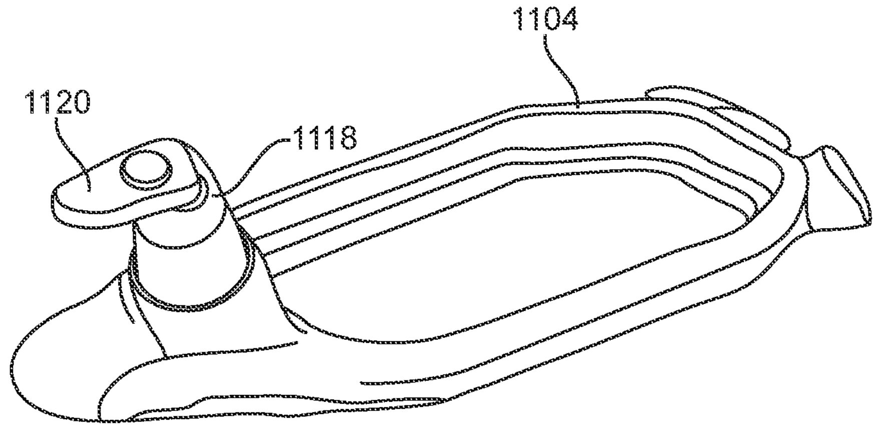
FIG. 28 is a perspective view of a direct print chassis according to one embodiment of the present invention.

FIG. 28 is a perspective view of a direct print chassis 1104 according to one embodiment of the present invention. In FIG. 28 direct print chassis 1104 includes receiver mount 1118 and grasping tab 1120.

Figure 29:
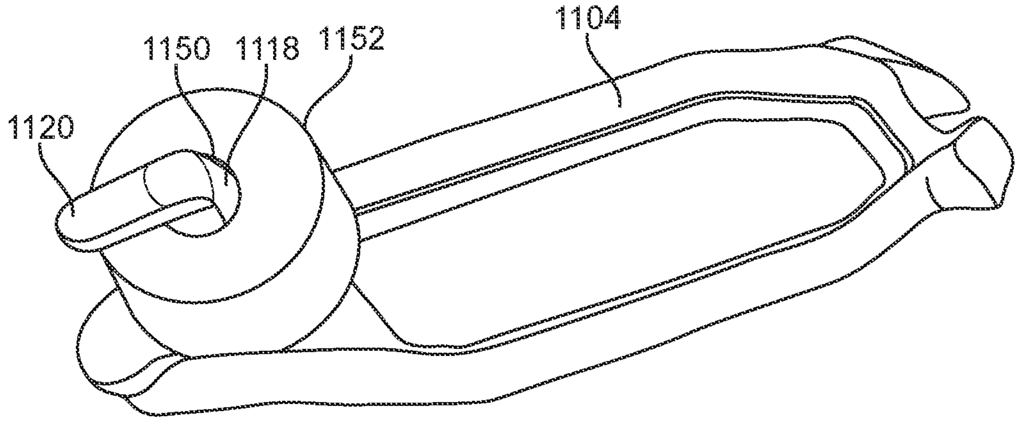
FIG. 29 is a perspective view of a direct print chassis according to one embodiment of the present invention.

FIG. 29 is a perspective view of a direct print chassis according to one embodiment of the present invention. In FIG. 29 direct print chassis 1104 includes receiver mount 1118 and grasping tab 1120. Receive coil assembly 1152 may be mounted on direct print chassis 1104 by passing receiver mount 1118 through receive coil mounting slot 1150. In embodiments of the invention grasping tab 1120 may extend from receive coil mounting slot 1150.

Figure 30:
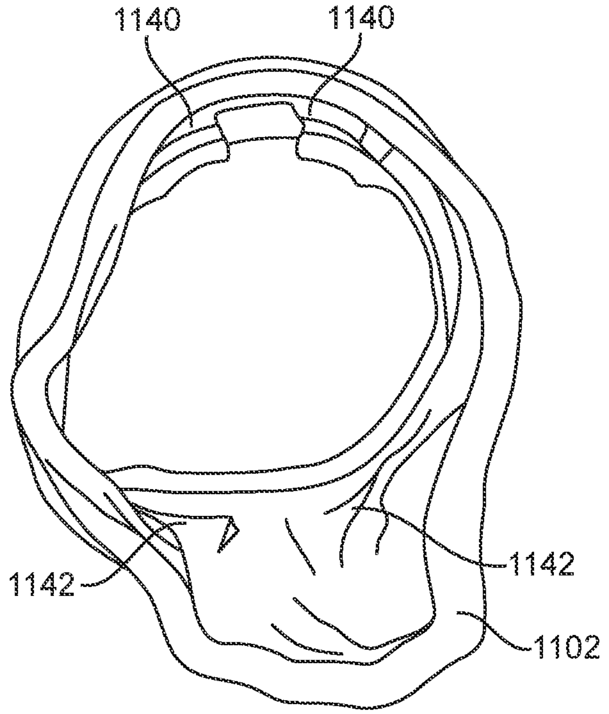
FIG. 30 is a top view of a direct print sulcus platform according to one embodiment of the present invention.

FIG. 30 is a top view of a direct print sulcus platform according to one embodiment of the present invention. In FIG. 30 sulcus platform 1102 may be printed using a 3D printer to ensure controlled wall thicknesses throughout the sulcus platform. In embodiments of the invention printing sulcus platform 1102 using 3D printing technologies may result in improvements in shape, wall thickness, interlocking features during assembly for greater precision, less mineral oil absorption, lower cost and greater design flexibility. In FIG. 30 sulcus platform 1102 may include anterior direct print chassis registration features 1140 and posterior direct print chassis registration features 1142.

Figure 31:
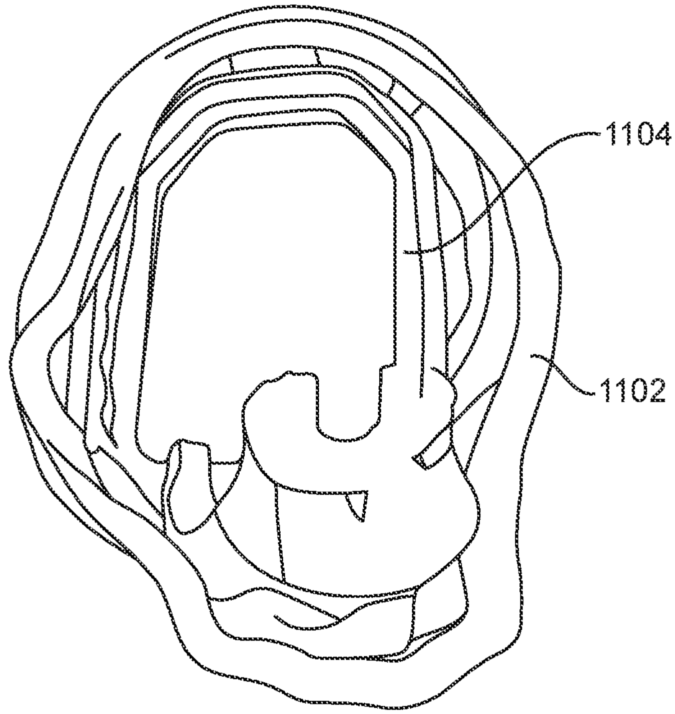
FIG. 31 is a top view of a direct print sulcus platform and direct print chassis according to one embodiment of the present invention.

FIG. 31 is a top view of a direct print sulcus platform 1102 and direct print chassis 1104 according to one embodiment of the present invention. In FIG. 31 direct print chassis 1104 may be positioned in sulcus platform 1102 using anterior and posterior direct print chassis registration features 1140 and 1142 to ensure proper alignment and positioning of direct print chassis 1104 in sulcus platform 1102. In embodiments of the invention anterior and posterior registration features 1140 and 1142 may include locking features to hold direct print chassis 1104 in place when direct print chassis 1104 is positioned in sulcus platform 1102. In embodiments of the invention anterior and posterior registration features 1140 and 1142 may prevent misalignment or rotation of direct print chassis 1104.

Figure 32:
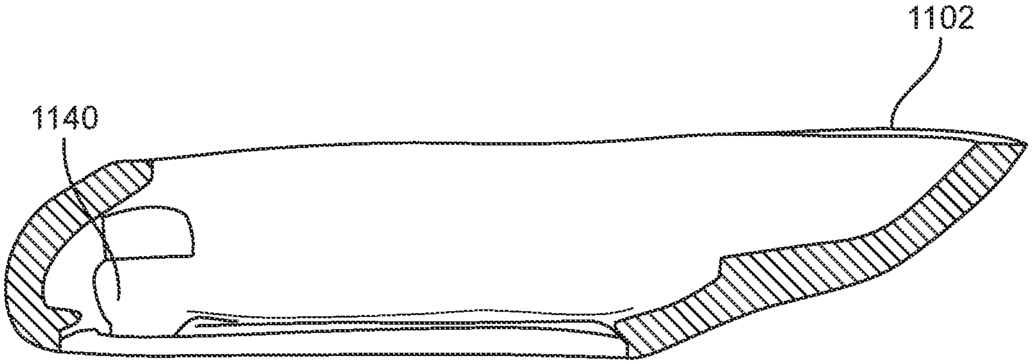
FIG. 32 is a side cut away view of a direct print sulcus platform according to the present invention.

FIG. 32 is a side cut away view of a direct print sulcus platform 1102 according to the present invention. In FIG. 32 anterior direct print chassis registration feature 1140 may be seen.

Figure 33:
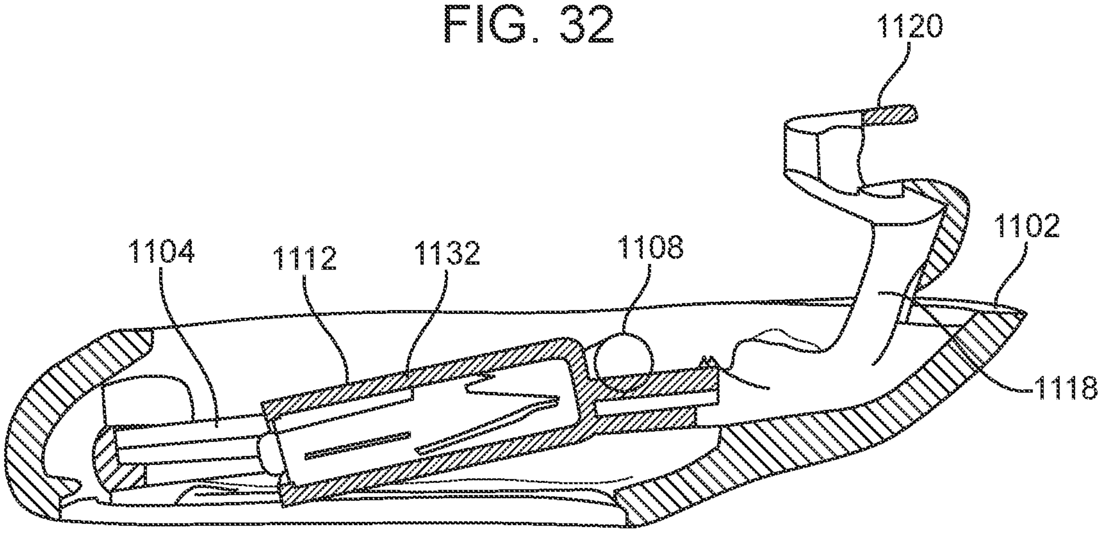
FIG. 33 is a side cut away view of a direct print sulcus platform, direct print chassis and motor assembly according to the present invention.

FIG. 33 is a side cut away view of a direct print sulcus platform 1102, direct print chassis 1104 and motor assembly 1132 according to the present invention. In FIG. 33 motor assembly 1132 may include microactuator 1112 and springs 1108. Direct print chassis 1104 may include receiver mount 1118 and grasping tab 1120.

Figure 34:
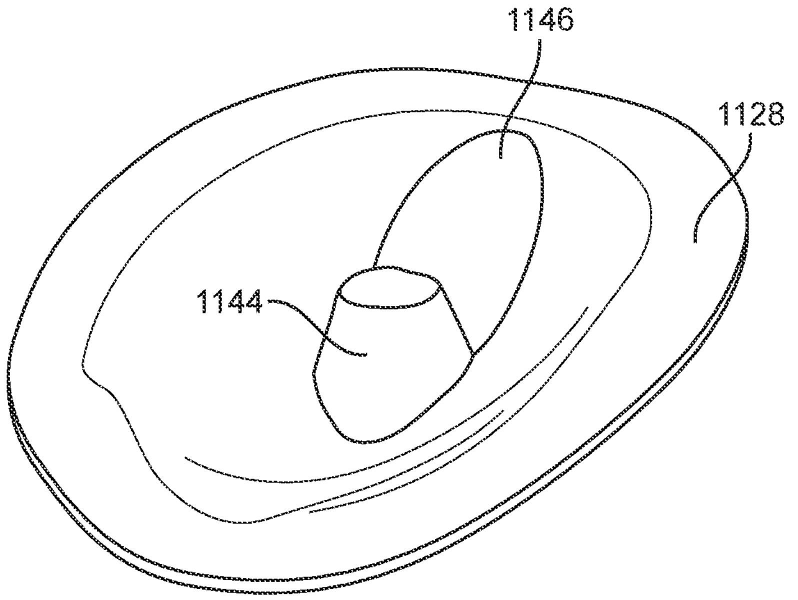
FIG. 34 is a top perspective view of a direct print sulcus platform according to the present invention.

FIG. 34 is a top perspective view of a direct print sulcus platform 1104 according to the present invention. In FIG. 34 sulcus platform 1104 may include drive post landing pad 1144 which may be integrated into and formed as a part of sulcus platform 1104 during the 3D printing process.

Figure 35:
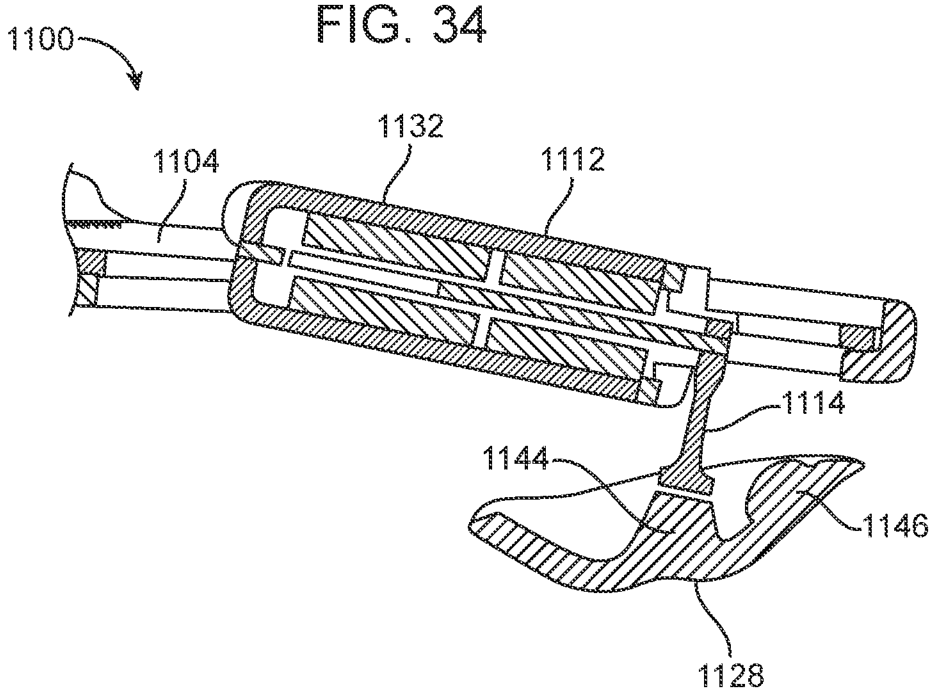
FIG. 35 is a side cutaway view of a portion of a contact hearing device according to the present invention including an umbo platform.

FIG. 35 is a side cutaway view of a portion of a contact hearing device 1100 according to the present invention including an umbo platform 1128. In FIG. 35 contact hearing device 1100 may include motor assembly 1132 and direct print chassis 1104. Motor assembly 1132 may include microactuator 1112 and drive post 1114. Drive post 1114 may be connected to umbo platform 1128 through drive post landing pad 1144. Umbo platform 1128 may further include orienting feature 1146.

Figure 36:
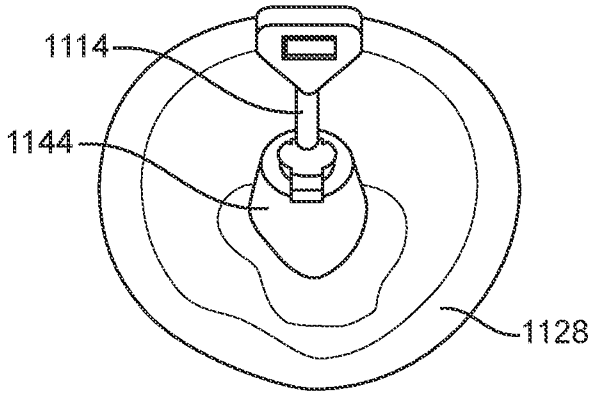
FIG. 36 is a top perspective view of an umbo platform according to the present invention.

FIG. 36 is a top perspective view of umbo platform 1128 according to the present invention. In FIG. 36, umbo platform 1128 includes drive post landing pad 1144. In embodiments of the invention drive post 1114 may be positioned on or connected to umbo platform 1128 such that a distal end of drive post 1114 sits on drive post landing pad 1144.

Figure 37:
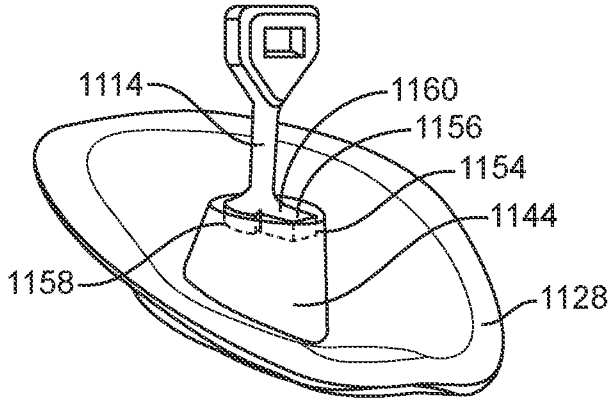
FIG. 37 is a side perspective view of an umbo platform according to the present invention.

FIG. 37 is a side perspective view of umbo platform 1128 according to the present invention. In FIG. 37, umbo platform 1128 includes landing pad 1144, which, in embodiments of the invention, includes a landing pad alignment feature 1158. In embodiments of the invention landing pad alignment feature 1158 may include alignment slot 1154. In embodiments of the invention a distal end of drive post 1114 may be positioned on landing pad 1144. In embodiments of the invention drive post 1114 may include a drive post alignment feature 1160 such as alignment flange 1156. In embodiments of the invention landing pad alignment feature 1158 may be a flange and drive post alignment feature 1160 may be a slot. In embodiments of the invention landing pad alignment feature 1158 interlocks with drive post alignment feature 1160 to ensure proper alignment of drive post 1114 and umbo platform 1128.

Figure 38:
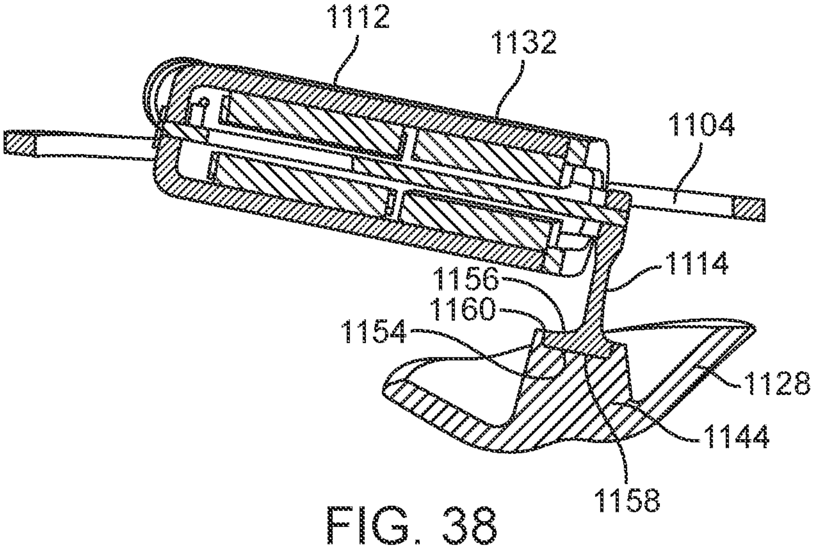
FIG. 38 is a side cutaway view of a motor assembly according to the present invention.

FIG. 38 is a side cutaway view of motor assembly 1132 according to the present invention. In FIG. 38 motor assembly 1112 may include direct print chassis 1104, microactuator 1112 and drive post 1114. Drive post 1114 may be connected to umbo platform 1144 at a distal end of drive post 1114. Drive post 1114 may include drive post alignment feature 1160, which, in embodiments of the invention may include alignment flange 1156. In the embodiment of FIG. 38 umbo platform 1128 may include drive post landing pad 1144, which may include drive post alignment feature 1160 where drive post 1114 is attached to drive post landing pad 1144. In embodiments of the invention drive post alignment feature 1160 may include alignment slot 1154.

In embodiments of the invention direct print chassis 1104 may be printed using a commercially available three dimensional printing system. In embodiments of the invention, the shape of the direct print chassis to be printed may be printed to conform to the unique physiology of a patients ear canal by scanning an impression of the ear canal and modeling an appropriate direct print chassis using mathematical modeling techniques.

In embodiments of the invention, a suitable reaction mixture for forming the direct print chassis may include 4,4'.Isopropylidenedicyclohexanol, oligomeric reaction products with 1-chloro-2,3-epoxypropane (CAS #30583-72-3). In embodiments of the invention, a suitable reaction mixture for forming the direct print chassis may include Mixture containing triarylsulfonium salt: 50% propylene carbonate, 50% mixed triarylsulfonium salts (CAS #108-32-7, 71449-78-0, 89452-37-9). In embodiments of the invention, a suitable reaction mixture for forming the direct print chassis may include 3-ethyl-3-hydroxymethyl-oxetane (CAS #3047-32-3).

In embodiments of the invention, a material suitable for use in forming a direct print chassis would have one or more of the following characteristics: a density (liquid) at 25 Degrees Centigrade of approximately 1.1 grams per centimeter cubed; a density (solid) at 25 Degrees Centigrade of approximately 1.17 grams per centimeter cubed; a tensile strength of approximately 52 MPa; a tensile modulus of approximately 2560 MPa; an elongation at break of approximately 6%; a flexural strength of approximately 83 MPa; a flexural modulus of approximately 2330 MPa; an impact strength (notched izod) of approximately 46 J/m; a heat distortion temperature (HDT) at 0.45 MPa of approximately 51 Degrees Centigrade; an HDT at 1.82 MPa of approximately 50 Degrees Centigrade; a hardness, Shore D, of approximately 86; and a glass transition (Tg) of approximately 70 Degrees Centigrade.

In embodiments of the invention, a direct print chassis includes a receiver mount, a motor mount pocket, a central frame and at least one anchor arm. In embodiments of the invention, the chassis may be formed as a single continuous component. In embodiments of the invention, the chassis may be 3D printed. In embodiments of the invention, the chassis may be formed to conform to the anatomy of the ear canal of a user. In embodiments of the invention, the motor mount pocket may be configured to receive and hold a motor mount. In embodiments of the invention, the motor mount may be a component of a motor assembly. In embodiments of the invention, the motor assembly may include a motor mount, a microactuator, and a connection component movably connecting the microactuator to the motor mount. In embodiments of the invention, the connection component may be one or more springs. In embodiments of the invention, the motor assembly may include one or more molded sliders. In embodiments of the invention, the molded sliders may be connected between the connection component and the motor assembly. In embodiments of the invention, the chassis may be connected to a sulcus platform configured in the shape of the anatomy of at least a portion of the user's ear canal. In embodiments of the invention, the chassis may include at least one anchor surface at a distal end of the anchor arm, the anchor surface being configured in the shape of at least a portion of the user's ear canal. In embodiments of the invention, the anchor arms may have a length which is determined by subtracting the width of the sulcus platform from the length required to fit the anchor arm to the user's anatomy without the sulcus platform. In embodiments of the invention, the sulcus platform being connected to the chassis at distal ends of the anchor arm. In embodiments of the invention, the sulcus platform may be connected to the chassis at the anchor surfaces. In embodiments of the invention, anchor arms may extend from a proximal end of the chassis on a first side of a central axis of the chassis. In embodiments of the invention, anchor arms may extend from a distal end of the chassis on both sides of the central axis of the chassis. In embodiments of the invention, the motor mount pocket may be formed in the shape of at least a portion of the motor mount. In embodiments of the invention, a receive coil may be mounted in the receiver mount. In embodiments of the invention, the receive coil may be mounted in a three prong jewel configuration. In embodiments of the invention, a photodetector may be mounted in the receiver mount. In embodiments of the invention, the receiver mount may be manufactured in order to properly align a receive coils mounted therein with a transmit coil mounted in the ear canal of a user. In embodiments of the invention, the chassis may include preprinted wire channels for wires connecting components of the contact hearing device. In embodiments of the invention, the direct print chassis may be parylene coated. In embodiments of the invention, the central frame of the direct print chassis does not conform to the anatomy of the user.

In embodiments of the invention the sulcus platform and/or umbo platform may be 3D printed out of a flexible elastomer. In embodiments of the invention the use of 3D printing of the sulcus platform may be advantageous in allowing the designer to add design features which improve the performance of the sulcus platform and/or umbo platform may facilitate the selective thickness of regions of the sulcus platform and/or umbo platform. In embodiments of the invention the materials used to print the sulcus platform and/or umbo platform may have a Shore A durometer of 75 plus or minus 10%. In embodiments of the invention the materials used to print the sulcus platform and/or umbo platform may have a Shore A durometer of between 40 (plus or minus 10%) and 85 (plus or minus 10%). In embodiments of the invention the sulcus platform and/or umbo platform has a Shore A durometer which is lower than the durometer of the material used to print the direct print chassis. In embodiments of the invention 3D printing of the sulcus platform and/or umbo platform may be advantageous in that it facilitates engineered wall thicknesses, controlled wall thicknesses and repeatability of design and wall thicknesses. In embodiments of the invention 3D printing of the sulcus platform and/or umbo platform facilitates the incorporation of anatomical features of specific users, which facilitates matching the sulcus platform and/or umbo to the anatomy of the user.

In embodiments of the invention, the invention my include a chassis formed as a single continuous material, the chassis including: a receiver mount; a motor mount pocket; a central frame; and at least one anchor arm, wherein a distal end of the at least one anchor arm is shaped to fit the anatomy of a user. In embodiments of the invention the chassis is three D printed. In embodiments of the invention the motor mount pocket conforms to the shape of a motor mount. In embodiments of the invention the motor mount is a component of a motor assembly. In embodiments of the invention the motor assembly includes: a motor mount; a microactuator; and a connection component. In embodiments of the invention the connection component includes one or more springs. In embodiments of the invention the motor assembly includes one or more molded sliders. In embodiments of the invention the distal end of the at least one anchor arm is connected to a flexible sulcus platform. In embodiments of the invention the chassis includes at least two anchor arms, a first anchor arm at a first end of the chassis and a second anchor arm at a second end of the chassis, wherein the distal end of each anchor arm is shaped to fit the anatomy of a user. In embodiments of the invention a sulcus platform extends continuously around the chassis, the sulcus platform being connected to the chassis at the distal ends of the anchor arms. In embodiments of the invention the sulcus platform does not contact any portion of the chassis except the distal ends of the anchor arms. In embodiments of the invention the sulcus platform conforms to the anatomy of a user. In embodiments of the invention the distal end of the at least one anchor arm forms an anchor surface. In embodiments of the invention the anchor surface conforms to the shape of a specific portion of the user's ear canal. In embodiments of the invention at least one anchor surface conforms to the shape of a portion of the user's anterior sulcus. In embodiments of the invention the length of the anchor arms are determined by subtracting the width of the sulcus platform from the optimal depth as determined by a model of the user's ear canal. In embodiments of the invention the model is a physical model. In embodiments of the invention the anchor arms have a length which is determined by subtracting the width of the sulcus platform from the length required to fit the anchor arm to the user's anatomy without the sulcus platform. In embodiments of the invention at least one anchor surface conforms to the shape of at least a portion of a user's posterior sulcus. In embodiments of the invention the motor mount pocket includes a three prong mounting.

In embodiments of the invention, the invention may include a contact hearing device comprising a chassis, sulcus platform and umbo platform wherein: the chassis is formed as a single continuous material; the sulcus platform is formed as a single continuous material; the umbo platform is formed as a single continuous material. In embodiments of the invention the chassis includes: a receiver mount; a motor mount pocket; a central frame. In embodiments of the invention the sulcus platform includes one or more registration features adapted to mate with at least a portion of the chassis. In embodiments of the invention the umbo platform includes a drive post landing pad, the drive post landing pad including at least on alignment feature. In embodiments of the invention the chassis is three D printed. In embodiments of the invention the sulcus platform is three D printed. In embodiments of the invention the umbo platform is three D printed. In embodiments of the invention the motor mount pocket conforms to the shape of a motor mount. In embodiments of the invention the motor mount is a component of a motor assembly. In embodiments of the invention the motor assembly includes: a motor mount; a microactuator; and a connection component. In embodiments of the invention the connection component comprises one or more springs. In embodiments of the invention the motor assembly includes one or more molded sliders. In embodiments of the invention the sulcus platform conforms to the anatomy of a user. In embodiments of the invention the motor mount pocket comprises a three prong mounting.

Definitions

Audio Processor—A system for receiving and processing audio signals. Audio processors may include one or more microphones adapted to receive audio which reaches the user's ear. The audio processor may include one or more components for processing the received sound. The audio processor may include digital signal processing electronics and software which are adapted to process the received sound. Processing of the received sound may include amplification of the received sound. The output of the audio processor may be a signal suitable for driving a laser located in an ear tip. The output of the audio processor may be a signal suitable for driving an antenna located in an ear tip. The output of the audio processor may be a signal suitable for driving an inductive coil located in an ear tip. Audio processors may also be referred to as behind the ear units or BTEs.

Contact Hearing System—A system including a contact hearing device, an ear tip and an audio processor. Contact hearing systems may also include an external communication device. An example of such system is an Earlens hearing-aid that transmits audio signal by laser to a contact hearing device which is located on or adjacent to the ear drum. The contact hearing system may also be referred to as a smart lens.

Contact Hearing Device—A tiny actuator connected to a customized ring-shaped support platform that floats on the ear canal around the eardrum, where the actuator directly vibrates the eardrum causing energy to be transmitted through the middle and inner ears to stimulate the brain and produce the perception of sound. The contact hearing device may comprise a photodetector, a microactuator connected to the photodetector and a support structure supporting the photodetector and microactuator. The contact hearing device may comprise an antenna, a microactuator connected to the antenna and a support structure supporting the antenna and microactuator. The contact hearing device may comprise a coil, a microactuator connected to the coil and a support structure supporting the coil and microactuator. The contact hearing device may also be referred to as a Tympanic Contact Actuator (TCA), a Tympanic Lens, a Tympanic Membrane Transducer (TMT), a smart lens.

Ear Tip—A structure designed to be placed into and reside in the ear canal of a user, where the structure is adapted to receive signals from an audio processor and transmit signals to the user's tympanic membrane or to a device positioned on or near the user's tympanic membrane (such as, for example, a contact hearing device). In one embodiment of the invention, the signals may be transmitted by light, using, for example, a laser positioned in the light tip. In one embodiment of the invention, the signals may be transmitted using radio frequency, using, for example, an antenna connected to the Ear Tip. In one embodiment of the invention the signal may be transmitted using inductive coupling, using, for example, a coil connected to the ear tip. The ear tip may also be referred to as a light tip, magnetic tip or mag tip.

Light Driven Hearing Aid System—A contact hearing system wherein signals are transmitted from an ear tip to a contact hearing device using light. In a light driven hearing system, light (e.g. laser light) may be used to transmit information, power or both information and power to a contact hearing device.

RF Driven Hearing Aid System—A contact hearing system wherein signals are transmitted from an ear tip to a contact hearing device using radio frequency electromagnetic radiation. In an RF driven hearing system, electromagnetic radiation may be used to transmit information, power or both information and power from the ear tip to the contact hearing device.

Inductively Driven Hearing Aid System—A contact hearing system wherein signals are transmitted from an ear tip to a contact hearing device using inductive coupling. In an inductively driven hearing system, magnetic waves may be used to transmit information, power or both information and power from the ear tip to the contact hearing device.

Light Tip—An ear tip adapted for use in a light driven hearing aid system. A light tip may include a laser.

Mag Tip—An ear tip adapted for use in an inductively driven hearing aid system. The mag tip may include an inductive transmit coil.

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

REFERENCE NUMBERS

| Number | |
|---|---|
| 100 | Magnet |
| 102 | Drive Coil |
| 110 | Inductively Coupled Contact Hearing System |
| 111 | Optically Coupled Contact Hearing System |
| 112 | Inductively Coupled Contact Hearing Device |
| 113 | Optically Coupled Contact Hearing Device |
| 120 | Inductive Ear Tip |
| 121 | Optical Ear Tip |
| 130 | Receive coil |
| 131 | Photodetector |
| 132 | Audio Processor |
| 142 | Electromagnetic waves |
| 144 | Light Signal |
| 210 | Cantilever Support |
| 218 | Drive Wires |
| 220 | Umbo Platform |
| 260 | Cable |
| 290 | Transmit Coil |
| 292 | Laser |
| 310 | External Microphone |
| 312 | Canal Microphone |
| 314 | Volume/Control Switch |
| 316 | Coil Winding |
| 318 | Ferrite Core |
| 320 | Analog to Digital Converter |
| 330 | Digital Signal Processor |
| 338 | Acoustic Vent |
| 340 | Ambient Sound/Acoustic Input (Audible Sound) |
| 342 | Transmit Electronics |
| 1100 | Contact Hearing Device |
| 1102 | Sulcus Platform (Perimeter Platform) |
| 1104 | Direct Print Chassis |
| 1106 | Receive Coil |
| 1108 | Springs |
| 1110 | Motor Mount |
| 1112 | Microactuator |
| 1114 | Drive Post |
| 1116 | Molded Sliders |
| 1118 | Receiver Mount (Coil/Photodetector) |
| 1120 | Grasping Tab |
| 1122 | Motor mount pocket |
| 1124 | Anchor Arm(s) |
| 1126 | Anchor Surfaces |
| 1128 | Umbo Platform |
| 1130 | Central Frame |
| 1132 | Motor Assembly |
| 1134 | Mounting Fingers |
| 1138 | Mounting Surface |
| 1140 | Anterior Direct Print Chassis Registration Features |
| 1142 | Posterior Direct Print Chassis Registration Features |
| 1144 | Drive Post Landing Pad |
| 1146 | Orienting Feature |
| 1148 | Receive Electronics |
| 1150 | Receive Coil Mounting Slot |
| 1152 | Receive Coil Assembly |
| 1154 | Alignment Slot |
| 1156 | Alignment Flange |
| 1158 | Landing Pad Alignment Feature |
| 1160 | Drive Post Alignment Feature |

The invention claimed is:

1. A chassis formed as a single continuous material, the chassis comprising;
- a receiver mount;
- a motor mount pocket
- a central frame;
- at least two anchor arms including a first anchor arm at a first end of the chassis and a second anchor arm at a second end of the chassis, wherein a respective distal end of each anchor arm of the at least two anchor arms is shaped to fit the anatomy of a user; and
- a flexible sulcus platform, wherein the flexible sulcus platform extends continuously around the chassis, the flexible sulcus platform being connected to the chassis at the respective distal end of each anchor arm of the at least two anchor arms.

2. A chassis according to claim 1, wherein the chassis is three D printed.

3. A chassis according to claim 1, wherein the motor mount pocket conforms to the shape of a motor mount.

4. A chassis according to claim 3, wherein the motor mount is a component of a motor assembly, wherein the motor assembly comprises:

a motor mount;

a microactuator; and a connection component.

5. A chassis according to claim 4, wherein the connection component comprises (i) one or more springs or (ii) one or more molded sliders.

6. A chassis according to claim 1, wherein the sulcus platform (i) does not contact any portion of the chassis except the distal ends of the anchor arms or (ii) conforms to the anatomy of a user.

7. A chassis according to claim 1, wherein the distal end of the at least one anchor arm forms an anchor surface.

8. A chassis according to claim 7, wherein the anchor surface conforms to the shape of a specific portion of the user's ear canal.

9. A chassis according to claim 8, wherein at least one anchor surface conforms to the shape of a portion of the user's (i) anterior sulcus or (ii) posterior sulcus.

10. A chassis according to claim 6, wherein the length of the anchor arms are determined by subtracting the width of the sulcus platform from the optimal depth as determined by a model of the user's ear canal.

11. A chassis according to claim 10, wherein the model is a physical model.

12. A chassis according to claim 6, the anchor arms having a length which is determined by subtracting the width of the sulcus platform from the length required to fit the anchor arm to the user's anatomy without the sulcus platform.

13. A chassis according to claim 1, wherein the motor mount pocket comprises a three prong mounting.

14. A contact hearing device comprising a chassis, a sulcus platform, and an umbo platform wherein:

the chassis is formed as a single continuous material, the chassis comprising:

a receiver mount a motor mount pocket a central frame; and at least one anchor arm, wherein a distal end of the at least one anchor arm is shaped to fit the anatomy of a user;

the sulcus platform is formed as a single continuous material;

the umbo platform is formed as a single continuous material;

wherein the sulcus platform includes one or more registration features adapted to mate with at least a portion of the chassis; and wherein the umbo platform includes a drive post landing pad, the drive post landing pad including at least one alignment feature.

15. A contact hearing device according to claim 14, wherein one or more of the chassis, the sulcus platform, or the umbo platform is three D printed.

16. A contact hearing device according to claim 14, wherein the sulcus platform conforms to the anatomy of a user.

17. A contact hearing device according to claim 14, wherein the motor mount pocket comprises a three prong mounting.

* * * * *